US012614329B2

(12) United States Patent
Seol et al.

(10) Patent No.: US 12,614,329 B2
(45) Date of Patent: Apr. 28, 2026

(54) AUDIO-DRIVEN FACIAL ANIMATION WITH EMOTION SUPPORT USING MACHINE LEARNING

(71) Applicant: Nvidia Corporation, Santa Clara, CA (US)

(72) Inventors: Yeongho Seol, Seoul (KR); Simon Yuen, Playa Vista, CA (US); Dmitry Aleksandrovich Korobchenko, Moscow (RU); Mingquan Zhou, Millbrae, CA (US); Ronan Browne, Fairfax, CA (US); Wonmin Byeon, Santa Cruz, CA (US)

(73) Assignee: Nvidia Corporation, Santa Clara, CA (US)

( * ) Notice: Subject to any disclaimer, the term of this patent is extended or adjusted under 35 U.S.C. 154(b) by 365 days.

(21) Appl. No.: 17/859,615

(22) Filed: Jul. 7, 2022

(65) Prior Publication Data

US 2024/0013462 A1 Jan. 11, 2024

(51) Int. Cl.
*G06T 13/20* (2011.01)
*G06T 13/40* (2011.01)
(Continued)

(52) U.S. Cl.
CPC ............ *G06T 13/205* (2013.01); *G06T 13/40* (2013.01); *G06T 17/20* (2013.01); *G10L 15/16* (2013.01); *G10L 21/10* (2013.01); *G10L 25/63* (2013.01)

(58) Field of Classification Search
CPC ....... G06T 13/205; G06T 13/40; G06T 17/20; G10L 15/16; G10L 25/63; G10L 21/10; G10L 2021/105
See application file for complete search history.

(56) References Cited

U.S. PATENT DOCUMENTS 9,705,904 B1   7/2017   Davis et al.
10,599,917 B1   3/2020   Shaburov et al.
(Continued)

FOREIGN PATENT DOCUMENTS

CN   102708583 A   10/2012
CN   104349074 A   2/2015
(Continued)

OTHER PUBLICATIONS

Hong P, Wen Z, Huang TS. "Real-time speech-driven face animation with expressions using neural networks." IEEE Transactions on neural networks. Jul. 31, 2002;13(4):916-27. (Year: 2002).*
(Continued)

*Primary Examiner* — King Y Poon
*Assistant Examiner* — Vincent Peren
(74) *Attorney, Agent, or Firm* — Hogan Lovells US LLP

(57) ABSTRACT

A deep neural network can be trained to output motion or deformation information for a character that is representative of the character uttering speech contained in audio input, which is accurate for an emotional state of the character. The character can have different facial components or regions (e.g., head, skin, eyes, tongue) modeled separately, such that the network can output motion or deformation information for each of these different facial components. During training, the network can be provided with emotion and/or style vectors that indicate information to be used in generating realistic animation for input speech, as may relate to one or more emotions to be exhibited by the character, a relative weighting of those emotions, and any style or adjustments to be made to how the character expresses that emotional state. The network output can be provided to a renderer to generate audio-driven facial animation that is emotion-accurate.

20 Claims, 19 Drawing Sheets

(51) Int. Cl.

| | |
|---|---|
| *G06T 17/20* | (2006.01) |
| *G10L 15/16* | (2006.01) |
| *G10L 21/10* | (2013.01) |
| *G10L 25/63* | (2013.01) |

(56) References Cited

U.S. PATENT DOCUMENTS

| | | | |
|---|---|---|---|
| 2003/0043153 A1 | 3/2003 | Buddemeier et al. | |
| 2004/0263510 A1 | 12/2004 | Marschner et al. | |
| 2008/0231640 A1 | 9/2008 | Pighlin et al. | |
| 2008/0269958 A1* | 10/2008 | Filev | G06N 3/006 |
| | | | 701/1 |
| 2015/0286858 A1 | 10/2015 | Shaburov et al. | |
| 2018/0137857 A1 | 5/2018 | Zhou et al. | |
| 2018/0336464 A1* | 11/2018 | Karras | G06N 3/047 |
| 2019/0130562 A1 | 5/2019 | Liu et al. | |
| 2020/0320171 A1 | 10/2020 | Park et al. | |
| 2020/0402501 A1 | 12/2020 | Prabhavalkar et al. | |
| 2021/0266274 A1 | 8/2021 | Liu et al. | |
| 2022/0020196 A1* | 1/2022 | Kuta | G10L 21/10 |
| 2023/0082830 A1* | 3/2023 | Fan | G06N 3/004 |
| | | | 704/258 |
| 2023/0343010 A1* | 10/2023 | Kwatra | G10L 21/10 |

FOREIGN PATENT DOCUMENTS

| | | | |
|---|---|---|---|
| CN | 104349074 | B | 9/2018 |
| CN | 110837738 | A | 2/2020 |
| CN | 112822068 | A | 5/2021 |
| EP | 3937170 | A1 | 1/2022 |
| GB | 2568475 | A | 5/2019 |
| JP | 2003346181 | A | 12/2003 |
| KR | 101720016 | B1 | 2/2017 |
| WO | 2019092459 | A1 | 5/2019 |

OTHER PUBLICATIONS

Cao Y, Tien WC, Faloutsos P, Pighin F. "Expressive speech-driven facial animation." ACM Transactions on Graphics (TOG). Oct. 1, 2005;24(4):1283-302. (Year: 2005).*

Busso C, Deng Z, Grimm M, Neumann U, Narayanan S. "Rigid head motion in expressive speech animation: Analysis and synthesis." IEEE transactions on audio, speech, and language processing. Feb. 20, 2007;15(3):1075-86. (Year: 2007).*

International Search Report and Written Opinion issued in PCT Application No. PCT/RU2022/000219 dated Apr. 6, 2023.

Non-Final Office Action issued in U.S. Appl. No. 18/457,251, dated Apr. 28, 2025.

* cited by examiner

300
302
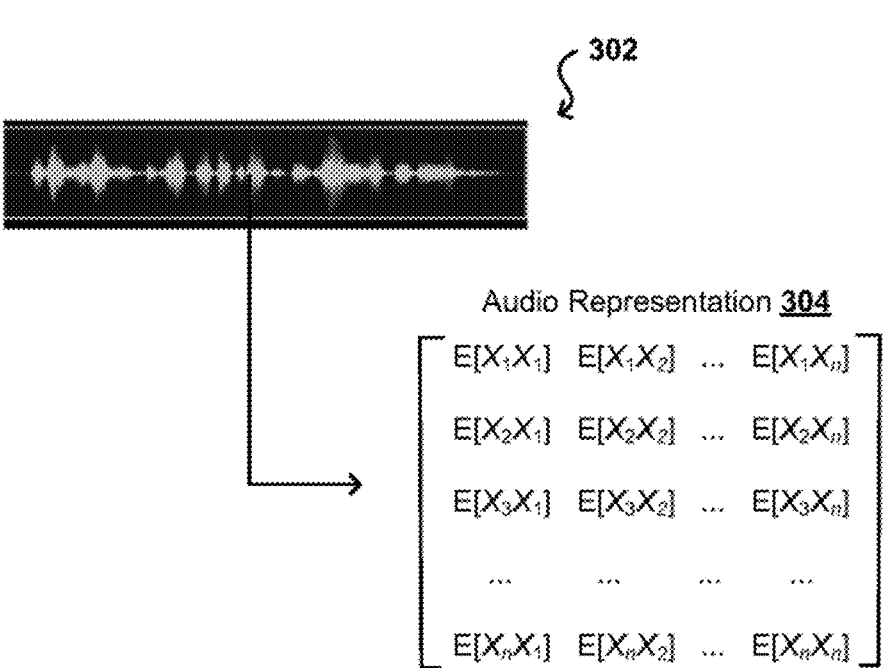
Audio Representation 304
$$\begin{bmatrix} E[X_1X_1] & E[X_1X_2] & \dots & E[X_1X_n] \\ E[X_2X_1] & E[X_2X_2] & \dots & E[X_2X_n] \\ E[X_3X_1] & E[X_3X_2] & \dots & E[X_3X_n] \\ \dots & \dots & \dots & \dots \\ E[X_nX_1] & E[X_nX_2] & \dots & E[X_nX_n] \end{bmatrix}$$
Emotion Vector 310
Neutral        [1, 0, 0, 0]
Joy                [0, 1, 0, 0]
Anger          [0, 0, 1, 0]
Sad                [0, 0, 0, 1]
Blended Vector 320
Emotional State    [0, 0.65, 0, 0.35]
FIG. 3

480

482

500

502 — Capture audio and 4D image data for actor(s) uttering speech with different emotion(s) and/or style(s)

504 — Indicate, for relevant portions of this captured data, respective emotion(s) and/or style(s)

506 — Perform reconstruction of facial animation for individual facial components (e.g., head, skin, jaw, eyes, tongue) from 4D image data 508 — Provide selected portion of audio data and emotion / style data as training data to be input to a neural network during network training (as may include sequence-to-sequence mapping)

510 — Generate, using the neural network, motion vectors for various points of these facial components 512 — Compare generated motion vectors against facial reconstruction data (acting as ground truth) and determine loss value (e.g., L2 loss)

514 — Update network parameters to attempt to reduce loss value

516 — End criterion?     No

Yes

518 — Provide trained network for inferencing

FIG. 5A

550

552 — Receive audio data including speech

554 — Receive any adjustments (e.g., emotion or style) to be applied for speech animation at specific points or keyframes 556 — Provide audio data and adjustment(s) to a trained neural network 558 — Receive, from the neural network, inferred motion vectors for individual frames, the motion vectors indicating motion for points corresponding to a plurality of facial components (e.g., head, skin, eyes, tongue, jaw)

560 — Provide the motion vectors to a renderer to generate frame(s) of facial animation 562 — Modify?

Yes → 564 — Indicate emotion/style modification(s) and keyframe(s)

No ↓

566 — Provide animation for presentation / storage

FIG. 5B

DATA CENTER
800

1532

AUDIO-DRIVEN FACIAL ANIMATION WITH EMOTION SUPPORT USING MACHINE LEARNING

BACKGROUND

It may be desirable for various operations to animate a character to appear as if that character is uttering speech represented by audio data. Due in part to the time and complexity of creating such animation, it can be beneficial to automate such a process, particularly for real-time operations. Machine-learning based approaches have been used to generate animation of characters based on input audio, but these prior approaches are generally limited in their capabilities, producing animation that is not sufficiently realistic in many instances. For example, a prior approach can attempt to animate only the mouth region of a character, in order to correspond to speech represented by corresponding audio data, but this limited animation prevents the animation from appearing realistic upon presentation as it may keep other portions of the animation static, or at least not realistic in motion or behavior for the audio being uttered. This issue may be exacerbated for operations where the character is a virtual human that is intended to appear as an actual human that is uttering the speech in a realistic manner with realistic behavior.

BRIEF DESCRIPTION OF THE DRAWINGS

Various embodiments in accordance with the present disclosure will be described with reference to the drawings, in which:

FIG. 3 illustrates an approach to representing data for use in generating animation, according to at least one embodiment;

FIGS. 5A and 5B illustrate example training and inferencing processes for a network to generate animation of a character to correspond to input audio, according to at least one embodiment;

DETAILED DESCRIPTION

Figure 1A:
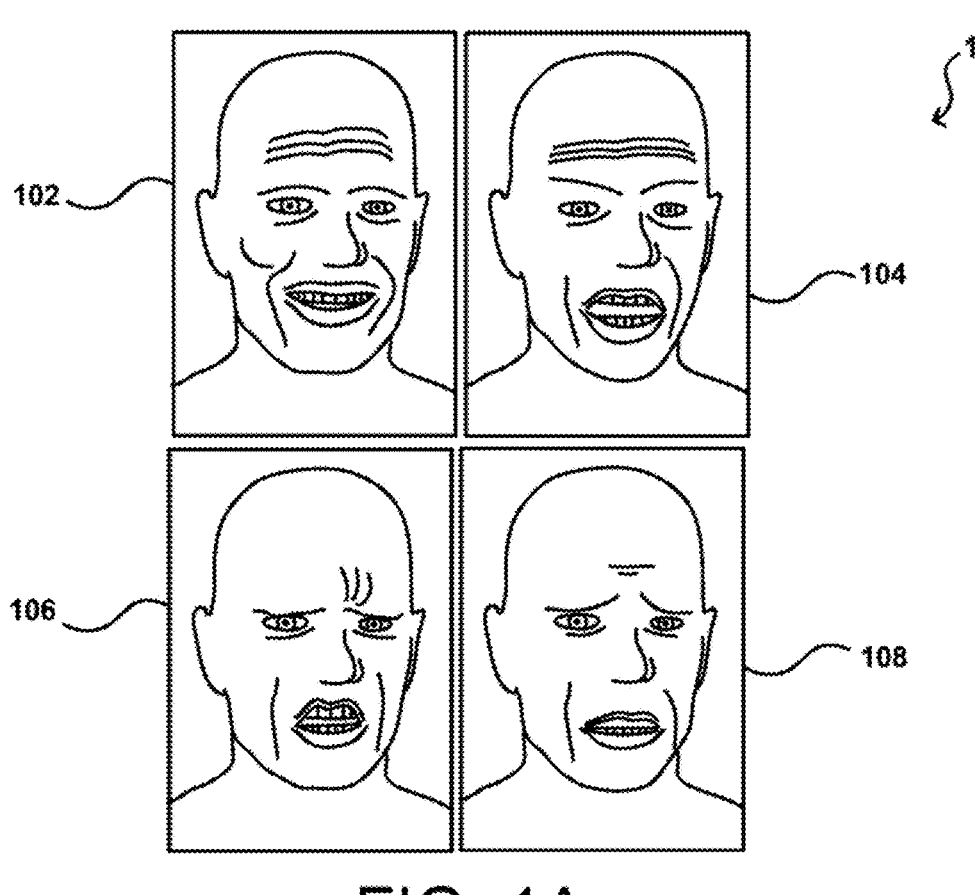
FIGS. 1A and 1B illustrate aspects of a character that can be animated based, at least in part, upon speech data, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments can generate animation that is representative of one or more characters uttering speech represented by audio data. This can include, for example, high resolution, full three-dimensional (3D) facial animation for presentation as part of a movie, game, artificial intelligence (AI)-based agent, teleconference, virtual/augmented/mixed/enhanced reality experience, and/or other media presentation, content, or experience. A deep neural network, such as may correspond to a U-Net, frame-based convolutional neural network (CNN), or recurrent neural network (RNN), can take as input a segment of audio data—such as may correspond to a sliding window of time through an audio file or stream—and can receive input regarding an emotion and/or style with which a character is to be animated to utter speech contained in that audio segment. The network can then provide output, such as motion, vertex, and/or deformation data, that can be provided to a renderer, for example, in order to generate or synthesize the facial animation corresponding to that portion of the speech. During training, the network may receive, in addition to audio input, an emotion vector that indicates one or more emotions, with potential relative weightings, to use to render the facial animation for an input audio clip. The emotion(s) indicated by the data may change at various points, or keyframes, in the audio data. The network may also receive a style vector (or style information incorporated in the emotion vector or other emotional data representation) that indicates a modification or fine control of the animation to be generated for the indicated emotion(s), as may relate to a style of animation or may relate to specific motions to be modified or enhanced, among other such options. The motion or deformation information output by the network can correspond to a set of facial (or other body) components or portions that can be animated, at least somewhat independently, to realistically represent the character uttering input speech. These components can include, for example, a head, jaw, eyeballs, tongue, or skin of the character. In embodiments, in addition to or alternatively from facial components or portions, body components or portions— such as arms, legs, torso, neck, etc.—may be modeled. Modeling each of these facial (and/or body) components separately, and determining deformations for each of these components, can cause the rendered facial (and/or body)

animation to appear more realistic for a given emotion, particularly when considering any style data provided to the network.

When generating such image or video data for various operations, it can be a goal (or in at some examples required) for a representation of a character—such as a human, robot, animal, or other such entity—to behave as realistically as possible. Such realistic behavior may include various movements or actions in various states and under various conditions. For example, a character such as a character corresponding to the head region illustrated in a set 100 of images illustrated in FIG. 1 might be animated to have their mouth, face, and/or head move in such a way as to convey that the character is uttering speech represented by audio data, which may be provided for playback or other presentation along with this animation. In order to make this animation appear as realistic as possible, it may not be enough to move only the mouth of the character to appear to utter the words in the speech, as an emotional state or set of circumstances might impact how the character physically moves other elements (e.g., eyes, tongue, etc.) of their face while uttering that speech. For example, the character might be animated to utter the words "I'm here." Simply animating the mouth to correspond to the formation of the words is not sufficient to convey realism in various situations, as the user might utter those words with very different intent, emotion, or style. For example, as illustrated in a first image 102 the character might be animated to utter the words with a happy emotion, such as where the character has arrived home to their family and is happy to see them. In a second image 104, the character might be angry that they were called to a certain location, and may express anger when conveying that they have arrived. In a third image 106, the character might be feeling a sense of disgust, such as where the character is in a place that they really do not want to be but are compelled to visit. In a fourth image 108, the character might feel a sense of sadness, as the character may announce their arrival but had felt a need to arrive due to undesirable circumstances. There may be any of a number of other emotions that may be experienced by the character that are to be conveyed in different instances. In order to make this animation appear realistic, an animation system (or other image data generation or synthesis system, component, module, or device) can accept or infer an emotional state, and attempt to generate animation of this character that not only matches any audio to be uttered by this character, but also conveys that utterance with an emotional behavior.

Figure 1B:
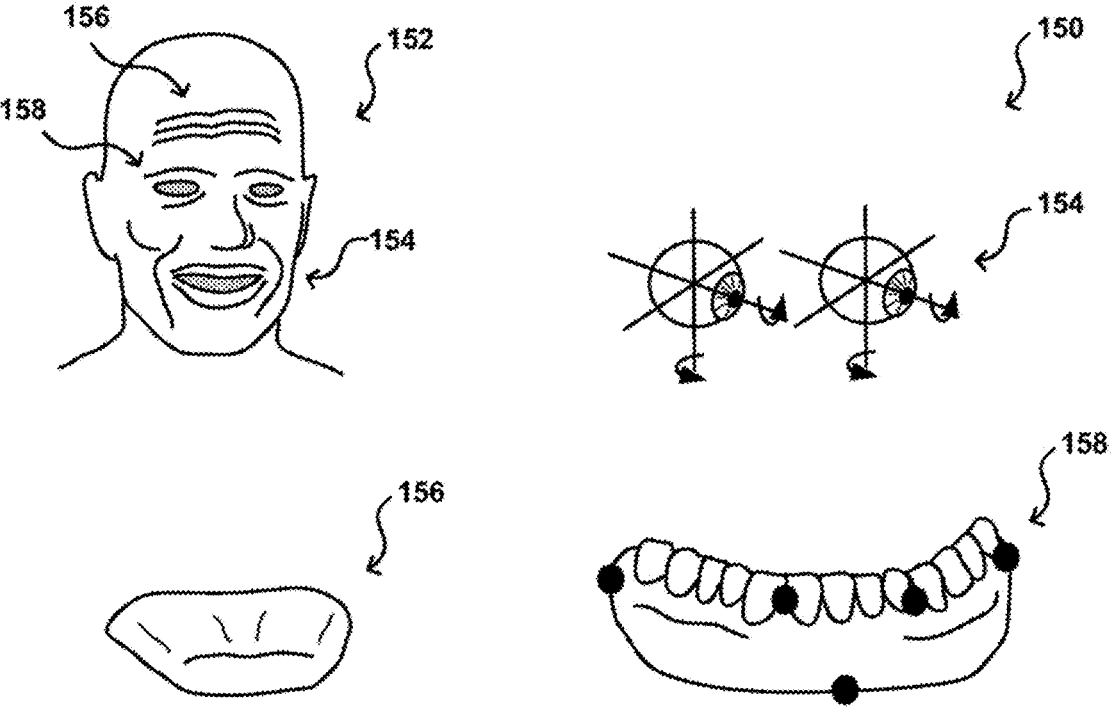

As illustrated, conveying of emotional behavior can include a number of different but related motions. For example, an outer surface of the user's head—corresponding to the skin 152 on the head as illustrated in FIG. 1B—can be deformed to convey both speech and emotion. This can include moving the lips 154 of the character to match the formation of the words being uttered in order to cause an animation of this character to appear to be uttering the speech. As mentioned, the lip motion may also be determined based, at least in part, upon an emotional state of that character while uttering that speech. There can be other aspects of the skin (or head) that may exhibit related behaviors based, at least in part, upon emotional state as well. For example, an amount or type of head movement (e.g., rotation or tilting of the head) may vary with different emotional states. Further, aspects such as certain wrinkles 156 or lines in the skin of the character may change for different emotions, such as to become more or less prominent or to take on specific shapes. Similar emotion-based behavior can be exhibited by other skin regions or features as well, such as by the eyebrows 158, cheeks, and so forth.

In addition to this outer skin or surface, there may be other aspects or features of this character that may change behavior with different emotions, which may be only somewhat related to the behavior of the skin or surface, as may be due to physical or kinematic constraints of the character. For example, the eyes 160 of the character can be modeled at least somewhat separately from the face. The position of the eyes can be dependent upon the location of the head or skin of the character, as the position of the eyes is relatively fixed within the eye sockets of the character, but the motion or orientation of the eyes can be at least somewhat independent of the behavior of the skin. For example, this character if angry might focus directly on a person to whom they are speaking, while this character might look away from another person if feeling sad or guilty. Similarly, an amount of saccadic movement, or a frequency with which the character changes a point of focus of their eyes, may change for different emotions. Thus, it can be desirable to infer eye orientation at least somewhat separately from skin, head, or surface behavior.

Conventional eye tracking solutions may not provide adequate performance. In at least one embodiment, pupil tracking can be performed from the input 3D capture data using an algorithm, such as a Lucas-Kanade optical flow algorithm, which provides a differential approach to optical flow estimation that assumes optical flow is essentially constant locally, and solves for basic optical flow within that local neighborhood. In instances where a blink or obstruction occurs, or where at least one eye is no longer visible in the captured image data, at least some amount of interpolation can be performed based on one or more prior (or subsequent, if available) image frames. Such eye tracking approaches may also capture small saccade movements of the eyes, which can help to make eye movement appear more natural in the rendered facial animation. Such an approach can model eye movement accurately without requiring image data representative of an image(s) focused primarily on the eyes of the actor while uttering the speech.

Similarly, the tongue 156 of the character can move at least somewhat independently from the head, within physical or kinematic constraints. An amount or type of tongue movement may vary with emotion, as a sad character might exhibit very little tongue movement, while an angry or excited character might exhibit a lot of tongue movement, which may differ in direction or pattern as well. An appropriate number of feature points can be used for a tongue mesh, allowing for realistic motion and behavior through, for example, mesh deformation. This number of points can be reduced or compressed (to a number such as, without limitation, 10 points) through a process such as principal component analysis (PCA) in order to reduce an amount of processing and memory needed for tongue mesh deformation.

There may also be other aspects or features of a character that may be modeled separately to improve realism as well. For example, a jaw 158 of the character may be modeled separately from the head of the character. While movement of a jaw may be able to be approximated through skin movement and deformation, it was observed that for at least some systems or implementation such inference may not be sufficiently accurate to avoid any post processing or manual cleanup of the produced animation. In order to improve accuracy, movement of this jaw 158 can be modeled separately, as the jaw can move in many different directions by different amounts for a similar state of the skin, such as where the character has his lips closed, but it may be difficult to capture this motion based on skin deformation alone. There may be other aspects, features, or components of a character that may benefit from being separately modeled as well, which may depend at least in part upon a type of character, as an animal, robot, or alien may be modeled to have different skeletal structure or kinematic capability. Different types or instances of the same character may also exhibit different behaviors or different emotions, such as people of different ages, genders, backgrounds, or other such aspects.

In many instances, a user may not exhibit only a single emotion, or may exhibit different levels of one or more emotions. For example, for an "angry" emotion type, the character might behave very differently if the character is slightly upset rather than if the character is enraged. A character may also be exhibiting multiple emotions at once, such as a character who is both happy that a child was accepted to college but sad that the child will be moving away, and thus would realistically exhibit traits associated with a combination of both emotions. There may also be characters that have different styles of behavior for a same emotion, at least under certain circumstances. For example, a character might act differently if talking to a stranger than to a partner, parent, or child. A character might also act differently if in a professional setting than a personal setting. In some instances, such as for a game or movie, an animator may simply want a specific look, style, or behavior exhibited by a character for a certain emotional state. Accordingly, it can be beneficial for at least some approaches presented herein to allow a user (or application or operation, etc.) to specify more than one emotion, or a combination of emotions. In some operations, a user (or other source) may also be able to specify weightings of these various emotions, in order to provide for more accurate combinations of emotion. A user may also be able to specify different emotions, combinations, or weightings at different time points or emotional "keyframes" in the animation, such as where a character might get increasingly sad or may calm down during a discussion. A user may also be able to specify a style with which a character conveys an emotion, which may also vary over time, such as at different keyframes in the animation.

Approaches in accordance with various embodiments can use at least some of these and other such aspects or features to provide for facial animation that provides realistic behavior under various emotional states for a variety of different character types. This can include, for example, audio-driven full three-dimensional (3D) facial animation with emotion control. In such an approach, realistic animation can be generated without any manual input or post-processing required—although possible where desired. Automating such animation can help to significantly reduce the amount of time, experience, and cost needed for manual (or at least partially-manual) character animation. Audio-driven facial animation can provide an efficient way to generate facial animation compared to traditional approaches, as only audio data is needed to drive the animation of a given character. Prior attempts at audio-driven animation could animate the lower face for lip synchronization, but were unable to generate proper motion or behavior for other facial areas or features—such as the upper face, teeth, tongue, eyes, and head—which may be needed for accurate behavior representation. In prior approached, it was often necessary to use additional manual or post-processing efforts to correct for inaccurate behavior in the generated animation. Prior attempts to include emotion in animation for speech typically also focused only on a single type of emotion for a duration of speech, which did not capture or accurately represent natural changes or shifts in behavior in many situations, which then also often required additional manual or post-processing efforts.

Figure 2:
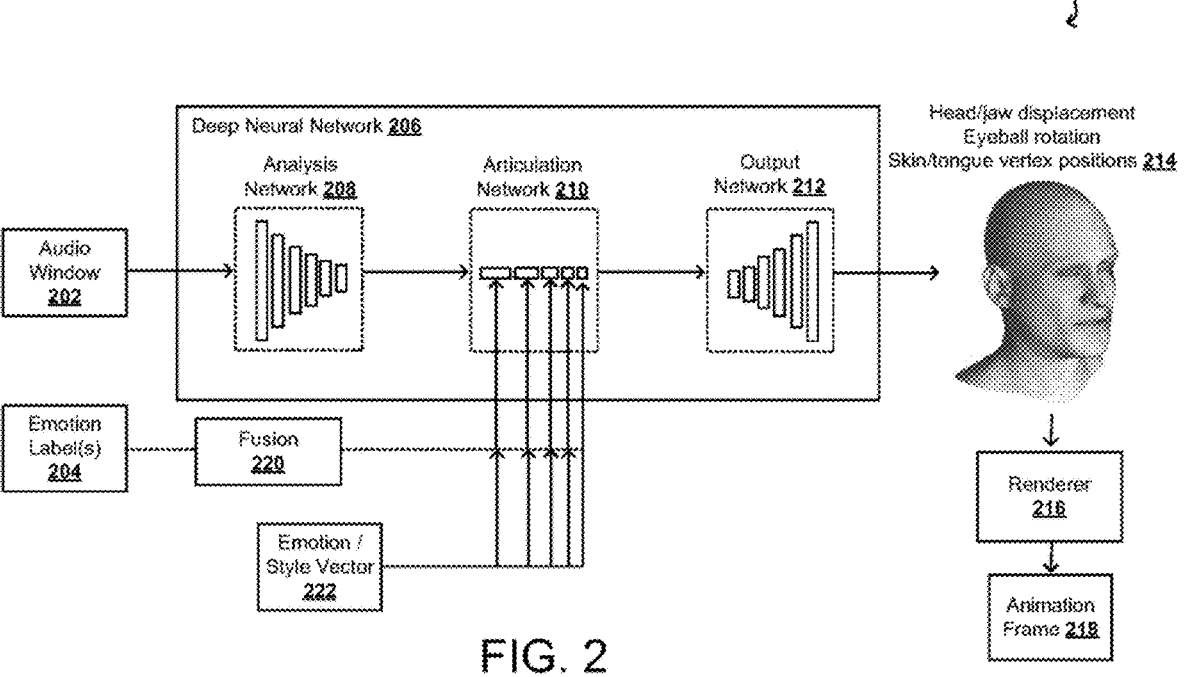
FIG. 2 illustrates an example network for generating animation to correspond to speech, including emotion and style support, in accordance with at least one embodiment.

Approaches in accordance with various embodiments can provide for automated, audio-driven animation, such as full 3D facial animation, with variable emotion control. In at least one embodiment, a collection of speech performances can be captured of one or more actors uttering speech (e.g., specific sentences) with different emotions, levels of emotion, combinations of emotion, or styles of presentation, among other such options. Emotions supported by such a system can include any appropriate emotion (or similar behavior or state) that is able to be at least partially represented through character animation, image synthesis, or rendering, as may include joy, anger, amazement, sadness, pain, or fear, among others. A data collection process can include a capture of, for example, 4D data, including multi-view 3D data over at least a period of time of utterance of the speech. Reconstruction of this captured facial behavior can be performed not only for the facial skin (or such surface), but also for other articulable or controllable components, elements, or features, as may include the teeth, eyeballs, head, and tongue (and/or body features or components, such as limbs, fingers, toes, torso, etc.). The reconstruction can provide geometric deformation data in the temporal domain for each separately (or at least somewhat separately) modeled facial (or other bodily) component or region. Such reconstruction can provide a full dataset for use in training, for example, a deep neural network 206 (as illustrated in FIG. 2) to perform a task such as 3D facial animation.

In at least one embodiment, a network to be trained can be based on a U-net architecture. A sequence-to-sequence mapping can be used to obtain a sufficiently long temporal context, which can be beneficial in generating physically and/or behaviorally accurate animation, particularly for upper face motion. In the example system 200 of FIG. 2, a segment of audio data—such as audio frames or a segment of audio within a current audio window 202—may be provided as input to the deep neural network, which can use an analysis network portion 208 to analyze the audio and encode features representative of features of the audio in the audio window 202, as may correspond to a portion of the speech. This analysis network portion 208 may include a shared audio decoder and encoder for encoding audio features into an audio feature vector, which can be provided as input to an articulation network portion 210 of the deep neural network 206. In this example, an emotion label 204 (or vector) can be provided as input, as well as style vector 222. In some embodiments, only a single vector may be provided as input that includes both style and/or emotion data, as may be fused together using a fusion component 220 or process. As discussed in more detail elsewhere herein, an emotion vector 204 may include data for one or more emotions that apply to speech being used for training, such as an emotion that the voice actor was instructed to use when uttering the speech that was captured in the audio data. In some instances, this may include data for a single emotion label, such as "anger," or may include data for multiple emotions, such as "anger" and "sadness," as well as potentially relative weightings of those two emotions. These labels and/or weightings may have been provided to the voice actor initially, may have been determined after the speech was uttered, and/or may involve updated labels after hearing the speech that was uttered for an audio capture for a specific emotion, among other such options.

In at least one embodiment, a style vector 222 may also be provided as input to this network 206 during training (and similarly in deployment). A style vector 222 can include data relating to any aspect of the animation or facial component motion that modifies how one or more points for one or more facial components should move for a given emotion or emotion vector. This may include impacting motion of specific features or facial components, or providing a style of overall animation to be used, such as "intense" or "professional." A style vector may also be viewed as a finer-grained control over emotion, where an emotion vector provides the label(s) of the emotion(s) to use, and the style provides finer control over how the emotion(s) is expressed through the animation. Other approaches to determining style data can be used as well, such as is discussed in more detail elsewhere herein. In different implementations, a single set of emotion and style vectors may be provided for a given audio clip, a set of vectors can be provided for each frame of animation to be generated, or a set of vectors can be provided for specific points or frames of animation (e.g., emotional keyframes) where at least one emotion or style value or setting is to be modified relative to a prior frame.

In this system 200, the emotion vector 204 and/or style vector 222 is fed into an articulation portion 210 of the deep neural network 206 at multiple levels, including at least a beginning and an end of the network to help condition the network. The network 206 may use a shared audio encoder and one or more (e.g., multiple) decoders for each facial component (e.g., face skin, jaw, tongue, eyeballs and head). During training, an output network portion 212 of the deep neural network 206 can generate a set of head/jaw displacements, eyeball rotations, and skin/tongue vertex positions 214 and/or motion vectors (or other motions or deformations) for individual feature points of the facial components, whether for each such feature point or for only those that have changed relative to a prior frame, among other such options. During training, these vertex positions can be compared against "ground truth" data, such as the original reconstructed facial data from the (e.g., 4D) image capture, in order to compute an overall loss value. In at least one embodiment, a loss such as an L2 loss can be used for both position and velocity of feature points in an output data representation. A loss function used to determine the loss value can include terms for position, motion, and adversarial loss in at least one embodiment. This loss value can be used during backpropagation to update network parameters (e.g., weights and biases) for the deep neural network 206. Once the network is determined to converge to an acceptable or desired level of accuracy or precision, and/or another training end criterion is satisfied (e.g., processing all training data or performing a target or maximum number of training iterations), the trained network 206 can be provided or deployed for inferencing.

During inferencing, the network may receive audio data 202 (e.g., only audio data in some embodiments) as input, and may infer a set of vertex positions 214 for various facial components (e.g., head, face, eyeballs, jaw, tongue), which can then be fed to a renderer 216 (e.g., a rendering engine of an animation or video synthesis system) in order to generate a frame of animation 218, which may be one of a series of frames that provide the animation upon presentation or playback. As discussed in more detail elsewhere herein, emotion or style vector data may also be provided as input to the deep neural network 206 if the generated vertex positions are to be modified in some way with respect to how the deep neural network 206 would otherwise infer the vertex positions based on the audio data, such as to convey a specific style or facial behavior to be used in inferring the vertex positions 214.

In some embodiments, a generative neural network such as a generative adversarial network (GAN) can be used to directly infer image data. A deep neural network 206, as described in more detail later herein, can output a vector that encodes position or motion data for various points on a mesh for one or more facial components, and can feed this output vector (or another output, such as a global transformation matrix) to a renderer 216 that can apply these values to one or more meshes for this character in order to guide the animation. This output matrix or vector can have a dimension that matches the features of the facial components, as may include, for examples and without limitation, 272 facial feature points for the skin, five for the head, five for the jaw, two for the eyeballs, ten for the tongue (using PCA compression, for example), and so on. Such an approach can provide a sufficiently smooth animation, such that additional smoothing or post-processing will not be needed in at least many situations. A system may, however, allow for additional smoothing to be applied, such as where a user may be able to specify one or more smoothing parameters.

In at least one embodiment, an auto-correlation feature can be extracted from the audio data in the audio window 202 for a current frame, and this feature can be fed into the network 206. The size of the audio window can be any appropriate or suitable size and may depend in part upon the implementation, but at a minimum can include a period of time corresponding to a frame of animation for a target frame rate (e.g., 60 Hz), and can include larger windows in order to consider portions of audio for nearby frames (e.g., prior or subsequent) in order to provide for more accurate and smooth animation, as well as more accurate emotion and/or style determination from the input audio. An example system can use one-hot vector encoding to represent different emotions, or emotional labels, with the resulting emotion vectors can be concatenated at the beginning and the end layer of the U-net.

In at least one embodiment, the output of such a network can include data specifying motion for different facial parts or components. The output may include data for components of a character beyond just facial components as well, as may relate to arms, legs, torso, and the like. Such a system may also generate accurate motion data for a character for frames or scenes where a face of the character is not visible, or is only partially represented in the scene. For facial parts with non-rigid deformation such as skin and tongue, captured (e.g., 4D) motion data can be compressed using, for example, Principal Component Analysis (PCA). This can allow a facial mesh with a large number of points, such as 60,000 points, to be represented by a vector of a much smaller dimension, as may correspond to 272 (or another number of) feature values. In such embodiments, the PCA weight vectors can be used as a training representation. In one embodiment, a fully-connected layer can fuse emotion and/or style data into a smaller vector, which can be inserted as a concatenation into individual layers of the network.

For facial parts with rigid transforms, such as head and teeth, a number (e.g., without limitation, 5 as illustrated in FIG. 1B) of markers or feature points can be selected or identified on the target mesh, and a position delta of these points from the reference position can be used as a training representation from which a rigid transform matrix can be computed. For a jaw, these five feature points may include points at either end of the jaw, a center point, and two intermediate reference points, where those intermediate points may not be necessary but can help with fine motion control and noise reduction. For rotatable components such as eyeballs, the system can use two rotation values (e.g., pitch and yaw) to represent horizontal and vertical rotations relative to a default orientation. At runtime, or during inferencing, full 3D facial animation output can be obtained by such a system. Such a system can also allow for inter-active control of emotion or style of this speech animation by feeding different emotion vectors 204 and/or style vectors 222 into the network, in order to allow for modifying or "fine-tuning" the motion of individual each facial compo-nents and facial regions, as may be part of a real-time or near-real time process, or as post-process.

In at least one embodiment, a deep neural network 206 can use a U-Net-based architecture. A U-Net-based archi-tecture can take as input a sequence of audio, such that smoothness of facial animation will be provided through the context of the input. In another embodiment, the network can have a per-frame convolutional neural network (CNN)-based architecture. A per-frame CNN architecture can receive as input audio windows of, for example and without limitation, about 0.5 seconds, which can include data for prior and sequent frames in a sequence, whereby the CNN can predict data for a middle frame in this sequence. In yet another embodiment, the network can have a recurrent neural network (RNN)-based architecture.

An RNN-based architecture may receive as input a smaller window of data and works with a shorter delay in real-time applications, such as for only 0.15 seconds of delay, and can predict motion based, at least in part, upon what was observed previously within this window. Other architectures can be used as well within the scope of the various embodiments, which can also provide for a smooth-ness of animation based at least in part upon a context provided to, or determined by, those architectures. While different architectures may provide adequate results, certain architectures may perform better under certain circum-stances or for certain aspects of speech-driven facial anima-tion. For example, a U-Net-based architecture was found to be highly accurate for very strong emotions with large deformations or motions, and demonstrated very smooth temporal motion. A CNN-based architecture performed well for real-time inferencing, and can generate very reliable lip synchronization motions. An RNN-based architecture was shown to perform well for real-time applications, with small latency, and demonstrated a greater relative variability in upper face motion.

FIG. 3 illustrates example input vectors 300, including audio and emotion vectors, that can be provided as input in at least one embodiment. In this example, an audio input 302 can be received, including audio data over at least a window of time. This audio 302 can be used to generate an audio vector generated from features extracted from the audio. As mentioned, this can include performing an audio auto-correlation extraction which can generate an audio feature matrix 304 as illustrated in FIG. 3, and these values can be used to generate an audio vector for input to the deep neural network. Similarly, a set of emotional labels may be pre-sented that can each be represented as a vector—such that one may be provided in place of the other in examples presented or described herein. In this example, an emotion vector 310 can indicate which emotion to convey (or is conveyed for training purposes) in a frame of audio, where here a single emotion is indicated by setting the value for that feature in the vector to 1, and the value for all other emotion feature to 0. Various other values, or collections of values, can be used in other embodiments as well. In some instances, the emotional vector can be a blended vector 320 that represents a blended emotional state. In this example, the blended vector includes a value of for the emotion "joy," and 0.35 for the emotion "sad." Here, where the values add up to a total of 1, to represent 100% of the emotional state, this indicates that the emotional state is 65% joy and 35% sad. As discussed elsewhere herein, these weightings do not have to add up to 100% in total, and instead each emotion can be set to a value between 0% and 100%, or another such value. Thus, a sadness value of 100% and a joy value or 100% in one system might equal a sadness value of 0.5 and a joy value of 0.5, among other such options, to indicate equal amounts of each emotion contributing to the overall emotional state.

In some embodiments, a style vector may be used to encode the residual facial expressions that are not as clearly represented by the audio input and the emotion labels. For example, a style vector may include values to be applied (directly or indirectly) to specific facial components or feature points, such as to cause a character to raise his or her upper lip more in one direction when talking. A neural network may learn specific style features during a training process to use for a style vector as well, among other such options, such as those discussed in more detail later herein.

Figure 4A:
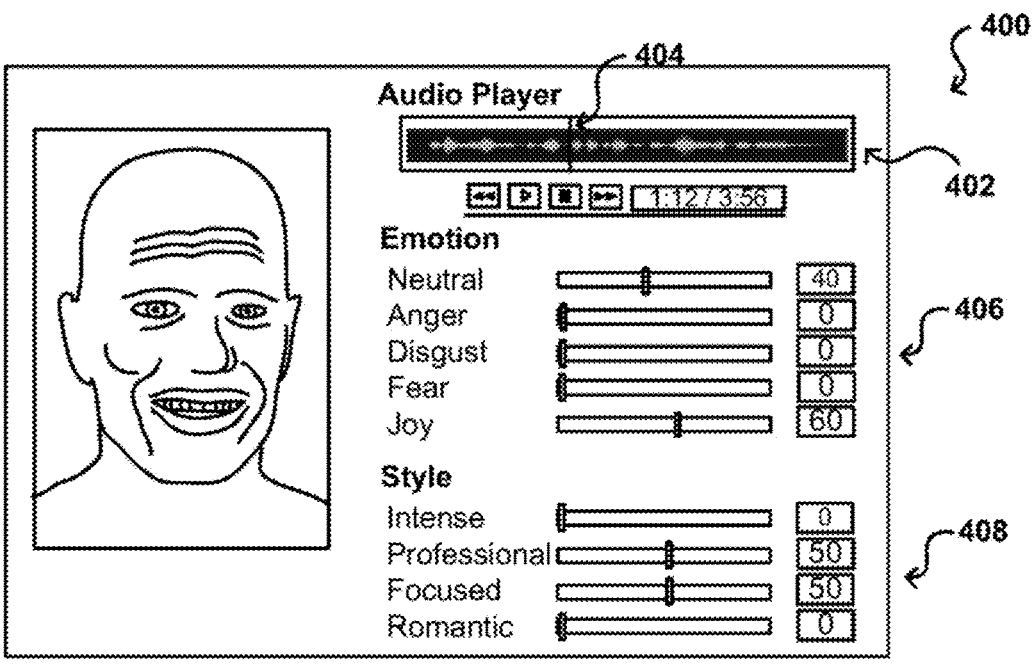
FIGS. 4A, 4B, and 4C illustrate different states of an interface that allows for keyframe value specification, according to at least one embodiment.
Figure 4B:
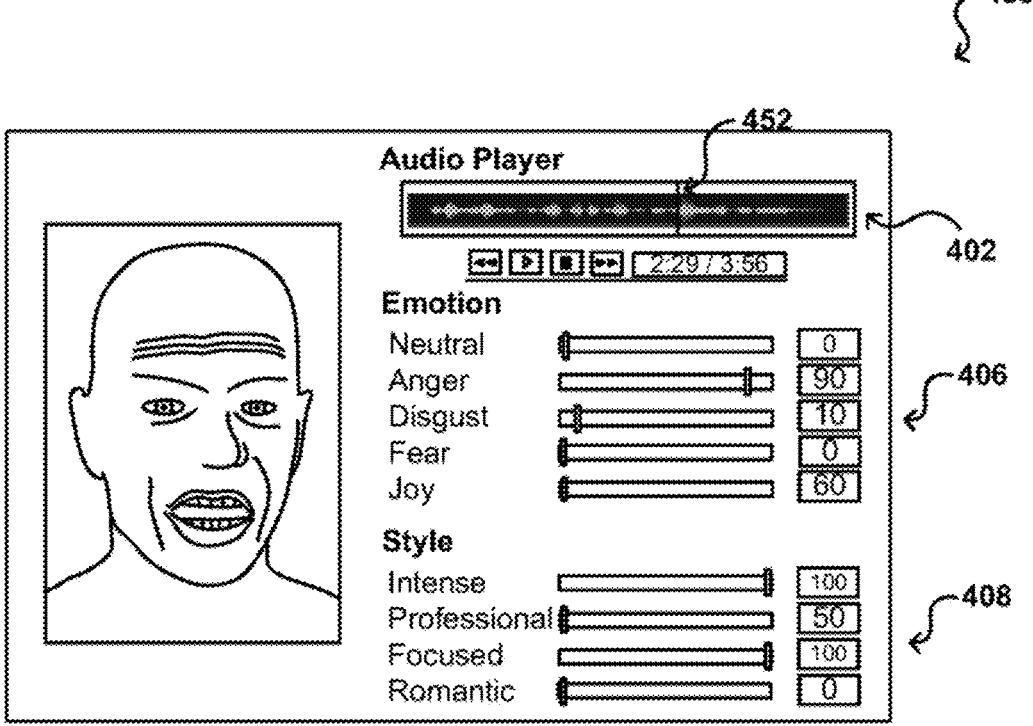
Figure 4C:
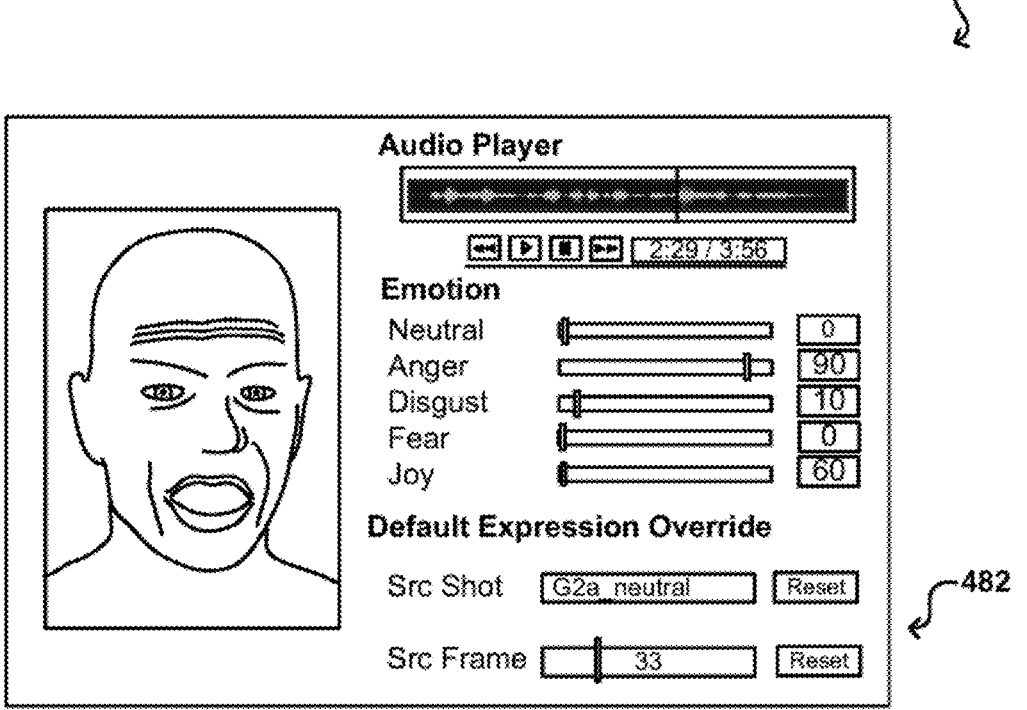

FIGS. 4A, 4B, and 4C illustrate example states 400, 450, 480 of a user interface that can be used to indicate emotions for training data, as well as to provide style or modification data (e.g., in the form of an emotion and/or style vector(s)) to facial animation at inference time, among other such options. When generating training data, a reconstruction may be displayed based on captured image data of an actor uttering the speech, along with one or more emotion values 406, and potentially one or more style values 408, that were provided to the actor to indicate how to utter the speech. A user viewing this interface may then make any value adjust-ments that are determined to be appropriate. For example, an actor might be asked to read a sentence using an angry emotion, but a listener may interpret the actor's utterance as also sounding somewhat sad. In order to more accurately label the training data, a user may adjust the label that is applied, so the network more accurately learns to interpret emotion from audio data. A user might also use such an interface to modify the reconstruction that is displayed. For example, maybe the user thinks that some modification of the reconstruction would convey the emotion better than was acted out by the actor while uttering the speech, or there may be some styles or behaviors that are specific to a character, or type of character. In this way, a user can help to better train a network to predict accurate or target motion for a given emotion, or blended emotion, from corresponding audio data. As illustrated, a time point 404 can be indicated in the audio data 402 for which these settings are to be applied. As mentioned, a single setting might be used for an audio clip or segment, but in other situations the emotion and/or style may change during such a clip or segment, such as at various points in time or for/at specific frames of animation, which can be referred to herein as emotional keyframes. An emotional keyframe can indicate when one or more values for an emotion and/or style is to change, and corresponding input vectors with these values can be pro-vided as input to a network during training in order to learn these changes. As illustrated in FIG. 4B, a different time point 452 in the same audio clip 402 is associated with very different emotion and style values. This may occur in response to something that triggers a change in the state of the character at a point in the audio file. At the first time point, the character was animated with an emotional state that was a combination of joy and neutral emotional state. As for the style, the character was to convey these emotions with a style that is both relatively professional and focused. At the second time point 452 as illustrated in FIG. 4B, the emotional state of the user has changed significantly, as illustrated by the updated character reconstruction. In this example, the character now has an emotional state that is primarily anger with a little disgust. With respect to style, this character now conveys these emotions with very high intensity and focus. As illustrated, this can have drastic impact on the motion of the facial components during these different points in the audio. As illustrated in the interface 480 of FIG. 4C, a user may be able to specify one or more default expression override values 482. In this example, this can include a source shot or image that is indicative of a default or prior expression to be used, as well as indication of a source frame for use of this override.

As mentioned, such an interface can be used at inference time as a type of post process, which can also be used for continued learning in at least some embodiments. For example, a user may view generated animation playback through this interface, where animation of the character is presented. In FIG. 4B, if the user thinks that the animation contains too much intensity for the situation, then the user can adjust the intensity style selector to reduce an intensity and have the frame(s) of animation re-rendered. If the user detects a little sadness in the character's speech that is not captured in the animation, then the user can adjust that setting as well. In some embodiments, a user may also be able to provide, as a type of style input, adjustment to specific feature points or facial components in the display. For example, the user can use a pointer to grab and move a position of the character's lip, and this information can be used as style input for re-rendering of the animation. Other changes can be provided as well, such as head movement, head tilt, eye movement or focus, or other such changes that can be conveyed through emotion or style input for re-rendering (or updated rendering or synthesis) of the animation. Various other animation control parameters can be specified through such an interface as well, which can impact the final rendering.

Various systems can also support retargeting. In retargeting, motion of one character can be mapped to motion of another character, such that similar animation can be generated for similar emotions and/or style. For example, retargeting may be applied to one or more (e.g., all) facial components such as skin, jaw, tongue, eyeball, etc. These facial components may be retargeted to more closely conform to or resemble the same facial components of a target or custom character. An interface such as illustrated in FIGS. 4A and 4B can be further beneficial in a remapping context where different characters might express emotion or styles in slightly different ways. A user may be able to load different characters into this interface and view how a retargeted rendering would appear for that character, then can modify one or more aspects or a style of motion or behavior for that specific character, or type of character.

FIG. 5A illustrates an example training process 500 that can be used to train a neural network for a task such as facial animation, in accordance with at least one embodiment. It should be understood that for this and other processes presented herein that there may be additional, fewer, or alternative operations performed in similar or alternative orders, or at least partially in parallel, within the scope of the various embodiments unless otherwise specifically stated. Further, while this example refers to facial animation, it should be understood that various other such tasks can benefit from aspects of such a training process well within the scope of various embodiments. In this process, audio and 4D image data (and/or other image data, such as 2D image data, 3D image data, etc.) is captured 502, or otherwise obtained, for one or more actors uttering speech, including the same or different words or content, using different emotions and/or styles. In at least some embodiments, the actor uttering the speech will be instructed to utter the speech using at least a specified emotion, and is further to "act" out the emotion during the utterance to attempt to capture image or video data representing realistic physical motion or behavior of one or more facial or body components during utterance with the specified emotion. This capture may be performed for any different number of emotions or phrases, and may include sufficient instances of utterance of each emotion to enable accurate training of, for example, a deep neural network. The relevant emotion(s) and/or style(s) used for these captures can be indicated 504 for relevant portions of this data, such as to specify specific emotions or styles represented at different time points or keyframes in this data. Further, a reconstruction 506 of the facial animation can be performed 506 in order to provide a sort of ground truth data, where a character mesh or other representation is deformed based upon the captured image data to provide a reference as to how facial components actually moved or deformed during utterance of specific speech with a specific emotion and/or style.

At least a portion of this training data can then be provided 508 for use in training a deep neural network. This can include, for example, for each frame of animation to be generated, a window of audio and emotion data for that frame. As mentioned, the audio and emotion data (as well as potentially any state data) can be used to generate feature vectors that can be provided as input to the network during training. As mentioned, sequence-to-sequence mapping can be used to obtain a sufficiently long temporal context for this input data, which can be beneficial in generating physically or behaviorally accurate animation. The neural network, upon receiving and processing this data, can generate 510 a set of motion vectors (or vertices or deformation values, etc.) for one or more facial feature points of one or more facial feature points of the character. This may include generating motion vectors for each facial feature point, or for only those feature points that undergo at least some amount of motion, among other such options. Once generated, this set of output motion vectors or vertices can be compared 512 against the facial reconstruction data for that frame, as a type of ground truth or reference data. A loss value, such as an L2 loss value, can be calculated for this frame of output data, and one or more network parameters can be updated 514 to attempt to reduce this loss value. A determination can be made 516 as to whether an end criterion has been reached for the training, such as the network converging, a maximum number of training iterations being performed, and/or a determination that all training data has been used (e.g., over a desired or suitable number of epochs), and if not then this process can continue with a next set of training data, as may correspond to another window of audio data containing speech with a given emotional state and/or style. If, however, an end criterion is met or satisfied then this network can be deployed or otherwise provided 518 for inferencing, such as to generate facial animation data from input audio (and/or from an emotion vector(s) and/or a style vector(s)).

FIG. 5B illustrates an example process 550 for generating facial animation data using such a trained deep neural network, in accordance with at least one embodiment. In this example, audio data is received 552 that includes at least some speech data for which a character is to be animated. In addition to this audio data, there may be one or more adjustments—such as to emotion or style of animation—that is to be applied to the speech animation at specific points or keyframes, which can be received 554 as additional input. This audio data and any received adjustment data can be provided 556 to a trained neural network, such as was trained using a process similar to the one described with respect to FIG. 5A. This process can then receive 558, from this neural network, inferred motion vectors (or vertices, etc.) for individual frames of animation, where those motion vectors indicate motion for feature points corresponding to a plurality of facial (or other body) components, such as a head, jaw, skin, eyeballs, or tongue, among other such options. These motion vectors are inferred in order to provide realistic animation for a character uttering the speech represented in the corresponding portion of the audio data, and allow for separate modeling and behavior of these separate components, within kinematic, structural, and/or other such restrictions. In this example, these motion vectors can then be provided 560 to a renderer (or other such system, service, device, or process) for rendering one or more frames of facial animation by, for example, deforming one or more meshes for these facial components according to these motion vectors. If, upon viewing this animation, it is determined 562 that one or more modifications are to be made, then a user (or process or operation) can indicate 564 one or more emotion or style modifications to be made, as well as at least one point or keyframe (if other than a current frame) for which the modification(s) is to be applied. Any modification can then be used to re-render the facial animation by repeating a portion of this process using the indicated modification data. Once there are no (further) modifications to be made, this animation can be provided 586 for purposes such as presentation or storage, among other such options.

Such a process can allow a deep neural network to effectively process human speech and generalize over different speakers. Such a process can also allow a network to discover variations in training data that cannot be explained by the audio alone, as may relate to an apparent emotional state. A three-way loss function as presented herein can also help to ensure that the network remains temporally stable and responsive under animation, even with highly ambiguous training data. Such a process can produce expressive 3D facial motion from audio in real time and with low latency. To retain independence from the details of the downstream animation system, such a system can output the per-frame positions of the control vertices of a fixed-topology facial mesh. Alternative encodings such as blend shapes or nonlinear rigs can be introduced at later pipeline stages, if needed for compression, rendering, or editability. An example network can be trained using three to five minutes of high-quality footage obtained using traditional, vision-based performance capture methods. Such a process has been observed to successfully model the speaking style of not only a single actor, but also from other speakers with different gender, accent, or language. This flexibility can be useful for various applications or operations, as may relate to in-game dialogue, low-cost localization, virtual reality, augmented reality, mixed reality, enhanced reality, and telepresence, among other such options. Such an approach may also prove useful in accommodating small script changes even in cinematics.

In at least some embodiments, given a short window of audio, a task of a network is to infer the facial expression at the center of the window. This expression can be represented directly as per-vertex difference vectors from a neutral pose in a fixed-topology face mesh. Once the network is trained, the mesh can be animated by sliding a window over a vocal audio track, with the network evaluated independently at each time step. Even though the network itself has no memory of past animation frames, it produces temporally stable results in practice.

An example and non-limiting CNN-based deep neural network consists of one special-purpose layer, ten convolutional layers, and two fully-connected layers, which may be divided into three conceptual parts as illustrated in FIG. 2. Data for an input audio window can be fed to a formant analysis network to produce a time-varying sequence of speech features that will subsequently drive articulation. The network can first extract raw formant information using fixed-function autocorrelation analysis, then refine it with a number (e.g., 5) of convolutional layers. Through training, the convolutional layers learn to extract short-term features that are relevant for facial animation, such as intonation, emphasis, and specific phonemes. Their abstract, time-varying representation can be the output of the final convolutional layer.

The result can be fed to an articulation network that consists of five further convolutional layers that analyze the temporal evolution of the features and eventually decide on a single abstract feature vector that describes the facial pose at the center of the audio window. As a secondary input, the articulation network accepts a (learned) description of emotional state and/or style to disambiguate between different facial expressions and speaking styles. The emotional state, alone or with style data, can be represented as an E-dimensional vector that is concatenated directly onto the output of each layer in the articulation network, enabling the subsequent layers to alter their behavior accordingly.

In at least one embodiment, each layer l outputs $F_l \times W_l \times H_l$ activations, where $F_l$ is the number of abstract feature maps, $W_l$ is dimension of the time axis, and $H_l$ is the dimension of the formant axis. Strided 1×3 convolutions can be used in the formant analysis network to gradually reduce $H_l$ while increasing $F_l$, e.g., to push raw formant information to the abstract features, until $H_l=1$ and $F_l=256$ at the end. Similarly, 3×1 convolutions can be used in the articulation network to decrease $W_l$, e.g., to subsample the time axis by combining information from the temporal neighborhood. Specific parameters can be chosen that consistently perform well while leading to reasonable training times. The results are not hugely sensitive to the exact number of layers or feature maps, but it may be beneficial in some systems to organize the convolutions in two distinct phases to avoid overfitting. The formant analysis network can perform the same operation at every point along the time axis, in order to benefit from the same training samples at different time offsets.

An example articulation network can output a set of 256+E+S abstract features that together represent the desired facial pose—e.g., E for the dimension of the emotion vector and S for the dimension of the style vector. These features can be fed to an output network to produce the final 3D positions of a set of control vertices in a tracking mesh. The output network can be implemented as a pair of fully-connected layers that perform a simple linear transformation on the data. The first layer maps the set of input features to the weights of a linear basis, and the set of second layers calculate the final PCA coefficients for face and tongue, rotation values for eyeballs, and the translational displacements for jaw and head.

A primary input to such a network is a speech audio signal, which may be converted to a format such as 16 kHz mono audio before feeding the audio to the network. The volume of each vocal track can be normalized to use a full [−1,+1] dynamic range, but such a system may or may not employ other kinds of processing, such as dynamic range compression, noise reduction, or pre-emphasis filter. An autocorrelation layer can convert the input audio window to a compact 2D representation for the subsequent convolutional layers. The resonance frequencies (formants) of the linear filter can carry essential information about the phoneme content of the speech. The excitation signal indicates the pitch, timbre, and other characteristics of the speaker's voice, which may be less important for facial animation, such that a system can focus, at least to some extent, on the formants to improve the generalization over different speakers.

An approach to performing source—filter separation can be based, at least in part, on linear predictive coding (LPC). LPC breaks the signal into several short frames, solves the coefficients of the linear filter for each frame based on the first K autocorrelation coefficients, and performs inverse filtering to extract the excitation signal. The resonance frequencies of the filter are entirely determined by the autocorrelation coefficients, at least some of the processing steps can be skipped and the system can use the autocorrelation coefficients directly as a representation of the instantaneous formant information. The representation can be appropriate for convolutional networks, as the layers can easily learn to estimate the instantaneous power of specific frequency bands.

In one example implementation, 520 ms worth of audio was used as input, e.g., as 260 ms of past and future samples with respect to the desired output pose. This value was chosen to capture relevant effects, such as phoneme coarticulation, without providing too much data that might lead to overfitting. The input audio window can be divided into 64 audio frames with 2× overlap, so that each frame corresponds to 16 ms (256 samples) and consecutive frames are located 8 ms (128 samples) apart. For each audio frame, the DC component can be removed and a Hann window applied to reduce temporal aliasing effects. Finally, K=32 autocorrelation coefficients can be calculated to yield a total of 64×32 scalars for the input audio window. Although much fewer autocorrelations, e.g., K=12, would suffice to identify individual phonemes, an approach can choose to retain more information about the original signal to allow the subsequent layers to also detect variations in pitch.

Inferring facial animation from speech can be an inherently ambiguous problem, because the same sound can be produced with very different facial expressions. This is especially true with the eyes and eyebrows, since they have no direct causal relationship with sound production. Such ambiguities are also problematic for deep neural networks, because the training data will inevitably contain cases where nearly identical audio inputs are expected to produce very different output poses. If a network has nothing else to work with besides the audio, it will learn to output the statistical mean of the conflicting outputs.

An example approach to resolve such ambiguities is to introduce at least a secondary input to the network. A small amount of additional, latent data can be associated with each training sample, so that the network has enough information to unambiguously infer the correct output pose. This additional data can encode all relevant aspects of the animation in the neighborhood of a given training sample that cannot be inferred from the audio itself, including different facial expressions and coarticulation patterns. This secondary input can include a predefined label, and may represent at least an emotional state of the actor. Besides resolving ambiguities in the training data, such secondary input can also be highly useful for inference, as it enables a system to mix and match different emotional states with a given vocal track to provide powerful control over the resulting animation.

In addition to or alternatively from relying on predefined labels, a system in accordance with at least one embodiment can adopt a data-driven approach where the network automatically learns a succinct representation of the style as a part of the training process. This allows the system to extract meaningful emotional states even from in-character footage, as long as a sufficient range of emotions is present. In at least one embodiment, a style state can be represented by an S-dimensional vector, where S is a tunable parameter that can be set to a value such as, without limitation, 16 or 24, and the components initialized to random values drawn from a Gaussian distribution. One such vector can be allocated for each training sample, with the matrix that stores these latent variables being referred to herein as a style database. The style data can be appended to the list of activations of all layers of the articulation network, which can make it a part of the computation graph of the loss function and, as a trainable parameter, it can be updated along with the network weights during backpropagation. The dimensionality of S is a tradeoff between two effects in this example. If S is too low, the styles fail to disambiguate variations in the training data, leading to weak audio response. If S is too high, styles may become too specialized to be useful for general inference.

Information provided by the audio can be limited to short-term effects within the, e.g., 520 ms interval by design. Consequently, a natural way to prevent the styles from containing duplicate information is to forbid them from containing short-term variation. Having the styles focus on longer-term effects may also be desirable for inference, as it may be desirable for the network to produce reasonable animation even when the emotional state remains fixed. This requirement can be expressed by introducing a dedicated regularization term in the loss function to penalize quick variations in the style database, which can lead to incremental smoothing of the emotional states over the course of training. One potential limitation to such an approach is that aspects such as blinking and eye motion may not be able to be modeled correctly since they do not correlate with the audio and cannot be represented using the slowly varying emotional state.

In embodiments, the emotional and style state may be appended to all layers of the articulation network to help to improve the results significantly in practice, as the emotional and style state can control the animation on multiple abstraction levels, and the higher abstraction levels may be more difficult to learn. Connecting to the earlier layers provides nuanced control over subtle animation features such as coarticulation, whereas connecting to the later layers provides more direct control over the output poses. The early stages of training can concentrate on the latter, while the later stages can concentrate on the former once the individual poses are reasonably well represented.

In one approach to training a deep neural network, an unstructured mesh with texture and optical flow data can be reconstructed from the, e.g., nine images captured for each frame. A fixed-topology template mesh, created prior to the capture work using a separate photogrammetry pipeline, can be projected on to the unstructured mesh and associated with the optical flow. The template mesh can be tracked across the performance and any issues are fixed semi-automatically, such as in software by a tracking artist. The position and orientation of the head can be stabilized using a few key vertices of the tracking mesh. Finally, the vertex positions of the mesh can be exported for each frame in the shot. These positions—or more precisely the deltas from a neutral pose—can be target outputs of this network when given a window of audio during training.

For each actor, a training set can consist of at least two parts: pangrams and in-character material. In general, the inference quality may increase as the training set grows, but a small training set may be highly desirable due to the cost of capturing high-quality training data. In at least one embodiment, it was empirically determined that around three to five minutes per actor represents a practical sweet spot. A pangram set can attempt to cover the set of possible facial motions during normal speech for a given target language, such as English. The actor speaks one to three pangrams, e.g., sentences that are designed to contain as many different phonemes as possible, in several different emotional tones to provide a good coverage of the range of expression. An in-character material set can leverage the fact that an actor's performance of a character is often heavily biased in terms of emotional and expressive range for various dramatic and narrative reasons. In the case of a movie or a game production, this material can be composed of the preliminary version of the script. Only the shots that are deemed to support the different aspects of the character are selected so as to ensure that the trained network produces output that stays in character even if the inference is not perfect, or if completely novel or out of character voice acting is encountered.

Given the potentially ambiguous nature of the training data, effort can be made to define a meaningful loss function to be optimized. In at least one embodiment, a specialized loss function can be used that consists of three distinct terms: a position term to ensure that the overall location of each output vertex is roughly correct, a motion term to ensure that the vertices exhibit the right kind of movement under animation, and a regularization term to discourage the style database from containing short-term variation.

Simultaneous optimization of multiple loss terms may be difficult in practice, because the terms can have wildly different magnitudes and their balance may change in unpredictable ways during training. One solution is to associate a pre-defined weight with each term to ensure that none of them gets neglected by the optimization. However, choosing optimal values for the weights can be a tedious process of trial and error that may need to be repeated whenever the training set changes. To overcome these issues, a normalization scheme can be used that automatically balances the loss terms with respect to their relative importance. As a result, an equal amount of effort can be devoted to optimizing each term, such that there is no need to specify any additional weights.

One error metric that can be used is the mean of squared differences between the desired output y and the output produced by the network ŷ. For a given training sample x, this can be expressed using position term P(x):

$$P(x) = \frac{1}{V} \sum_{i=1}^{V} \left( y^{(i)}(x) - \hat{y}^{(i)}(x) \right)^2 \qquad (1)$$

Here, V represents the total number of output features including skin/tongue PCA coefficients, rotation values of eyeballs, and translation displacement for jaw/head, and $y^{(i)}$ denotes the ith scalar component of $y=(y^{(1)}, y^{(2)}, \ldots, y^{(3V)})$. Even though the position term ensures that the output of the network is roughly correct at any given instant in time, it may not be sufficient to produce high-quality animation in all instances. It was observed that training the network with the position term alone may lead to a considerable amount of temporal instability, and the response to individual phonemes is generally weak. Accordingly, a network can be optimized in terms of vertex motion as well: a given output vertex should only move if it also moves in the training data, and it should only move at the right time. A system can thus address vertex motion as a part of the loss function.

One approach for training neural networks is to iterate over the training data in minibatches, where each minibatch consists of B randomly selected training samples $x_1, x_2, \ldots, x_B$. To account for vertex motion, we draw the samples as B/2 temporal pairs, each consisting of two adjacent frames. Operator m[•] can be defined as the finite difference between the paired frames, which allows defining motion term M(x) as:

$$M(x) = \frac{2}{V} \sum_{i=1}^{V} \left( m[y^i(x)] - m[\hat{y}^{(i)}(x)]^2 \right) \qquad (2)$$

In this equation, the factor 2 appears because M is evaluated once per temporal pair.

In addition, it can be beneficial to ensure that the network correctly attributes short-term effects to the audio signal and long-term effects to the emotional state. One approach can define a regularization term for the emotion/style database using the same finite differencing operator as above:

$$R'(x) = \frac{2}{E} \sum_{i=1}^{E} m[e^{(i)}(x)]^2 \qquad (3)$$

Here, $e^{(i)}(x)$ denotes the ith component stored by the emotion database for training sample x. It can be noted that this definition does not explicitly forbid the emotion/style database from containing short-term variation—it instead discourages excess variation on average. This may be significant in at least some instances, as the training data may contain legitimate short-term changes in the emotional state occasionally, and it may be undesirable for the network to incorrectly try to explain them based on the audio signal.

A caveat with Eq. 3 is that R'(x) can be brought arbitrarily close to zero by simply decreasing the magnitude of e(x) while increasing the corresponding weights in the network. Drawing on the idea of batch normalization, this trivial solution can be removed by normalizing $R^e(x)$ with respect to the observed magnitude of e(x):

$$R(x) = \frac{R'(x)}{\left( \frac{1}{EB} \sum_{i=1}^{E} \sum_{j=1}^{B} e^i(x_j)^2 \right)} \qquad (4)$$

In order to balance these three loss terms, one approach is to leverage the properties of an Adam (or other) optimization method used for training the network. In effect, Adam updates the weights of the network according to the gradient of the loss function, normalized in a component-wise fashion according to a long-term estimate of its second raw moment. The normalization makes the training resistant to differences in the magnitude of the loss function, but this is only true for the loss function as a whole—not for the individual terms. One approach is to perform similar normalization for each loss term individually. Using the position term as an example, the second raw moment of P(x) can be estimated for each minibatch and a moving average $v^P_t$ maintained across consecutive minibatches, as may be given by:

$$v^p_t = \beta \cdot v^p_{t-1} + (1 - \beta) \cdot \frac{1}{B} \sum_{j=1}^{B} P(x_j)^2 \qquad (5)$$

Here, t denotes the minibatch index and $\beta$ is a decay parameter for the moving average that may be set to a value such as, without limitation, 0.99. The system can initialize $$v^p_t = 0$$

and correct the estimate to account for startup bias to get $$v^p_t = v^p_t / (1 - \beta^t).$$

The average P(x) can then be calculated over the current minibatch and the value normalized according to $$v^p_t:$$

$$\ell^P = \frac{\left( \frac{1}{B} \sum_{f=1}^{B} P(x_j) \right)}{\left( \sqrt{\hat{v}^p_t + \epsilon} \right)} \qquad (6)$$

In Equation 6, $\epsilon$ is a small constant that can be set to a value such as $10^{-8}$ to avoid division by zero. Repeating Equations 5 and 6 for M(•) and R(•), a final loss function can be expressed as a sum over the individual terms $\ell = \ell^P + \ell^M + \ell^R$. In some embodiments, there may be further fine-tuning of the importance of the loss terms through additional weights.

In at least one embodiment, random time-shifting can be employed for training samples to improve temporal stability and reduce overfitting. Whenever a minibatch is presented to the network, the input audio window can be randomly shifted by up to 16.6 ms in either direction (±0.5 frames at 30 FPS). To compensate, the same shift can be applied for the desired output pose through linear interpolation. Both training samples in a temporal pair can be shifted by the same amount, with different random shift amounts being used for different pairs. In some embodiments, cubic interpolation of outputs instead of or in addition to linear interpolation may be used.

In order to improve generalization and avoid overfitting, multiplicative noise can be applied to the input of individual convolutional layers. The noise can have the same magnitude for every layer, and can be applied on a per-feature map basis so that all activations of a given feature map are multiplied by the same factor. Identical noise can be applied to paired training samples to get a meaningful motion term. One formula for this noise is $1.4^{N(0,1)}$. There may be no other type of noise or augmentation applied to the training samples besides the time-shifting of input/outputs and multiplicative noise inside the network. Some approaches may, however, perform operations such as adjusting the volume, adding reverb (both long and short), performing time-stretching and pitch-shifting, applying non-linear distortion, random equalization, and scrambling the phase information, among other such options.

Once trained, a deep neural network can be evaluated at arbitrary points in time by selecting the appropriate audio window, leading to facial animation at the desired frame rate. The latency of such an approach may depend, at least in part, upon the audio window size, which may reach a period of time into the past and/or the future. Coarticulation can set a lower bound for the look-ahead; it has been observed that the look-ahead can be limited to a values such as 100 ms during training with little degradation in quality, even though some coarticulation effects may be longer. Shortening the look-ahead further than this may lead to a quick drop in perceived responsiveness in certain instances, so a realistic lower bound for the latency of one embodiment can be set to around 100 ms.

When inferring the facial pose for novel audio, the network can be supplied with an emotional state vector and/or a style vector as a secondary input, which may also be part of a single emotion vector. As part of training, the network can learn a vector (e.g., a latent E-dimensional vector) for each training sample, and this emotion database can be used to obtain robust emotion vectors that can be used during inference.

During training, the network can attempt to separate out the latent information—e.g., everything that is not inferable from the audio alone—into an emotion/style database. However, this decomposition may result in some amount of crosstalk between articulation and the overall expression. In practice, many of the learned emotion/style vectors may only be applicable in the neighborhood of their corresponding training frames and are not necessarily useful for general inference. In at least one embodiment, a process can mine for robust emotion/style vectors using a three-step process. A problem experienced in many learned emotion vectors is that they deemphasize the motion of the mouth: when such a vector is used as a constant input when performing inference for novel audio, the apparent motion of the mouth may be subdued. One approach is to pick a few audio windows from a validation set that contain bilabials and a few that contain vowels, for which the mouth should be closed and open, respectively. The emotion/style database can then be scanned for vectors that exhibit the desired behavior for all chosen windows. Performing this preliminary culling for Character 1 resulted in 100 candidate emotion vectors for further consideration, and this response can vary with different emotion vectors.

A second step in this example culling process is to play back the validation audio tracks and inspect the facial motion inferred with each of the candidate emotion/style vectors. At this stage, vectors can be discarded that result in subdued or spurious, unnatural motion, indicating that the vector may be tainted with short-term effects. This stage narrowed the set to 86 candidate emotion vectors for Character 1. As a third and final step in this example, inference can be run on several seconds of audio from a different speaker and vectors with muted or unnatural response eliminated. With Character 1, this step left 33 emotion vectors.

The output of the network can be examined for several novel audio clips with every remaining emotion/style vector, and a semantic meaning (e.g., "neutral", "amused", "surprised", etc.) assigned to each of them, depending at least in part on factors such as the emotional state they convey. Which semantic emotions remain can depend on the training material, and it may not be possible to extract, e.g., a "happy" emotion if the training data does not contain enough such material to be generalizable to novel audio. Even after removing all but the best performing emotion vectors there can still be substantial variation to choose from. It was observed that emotion vectors mined in this way behave well under interpolation, e.g., sweeping from one emotion vector to another tends to produce natural-looking results. It therefore may be possible to vary the emotional state during inference based on high-level information from a game engine, or by manual keyframing.

The resulting facial animation can be highly stable. Primary sources of this temporal stability can include the motion term $\ell^M$ and time-shift augmentation, but even with these techniques there may be still a small amount of jitter left, such as in the lip area at 4 ms timescale for some inputs. This may result from aliasing between neighboring audio frames around features such as stops and plosives. This can be mitigated, at least in part, using at least some amount of ensembling: the network is evaluated twice for a given animation frame, a time (e.g., 4 ms) apart, and the predictions are averaged.

As mentioned, such an approach can also support retargeting. When training the model, the output network may become specialized for a particular mesh. For many operations, it may be desirable to drive several different meshes using audio input. Approaches discussed herein can support retargeting of deformation, or transfer of deformation behavior between characters, or for the same character at different stages in life, among other such options.

As discussed, aspects of various approaches presented herein can be lightweight enough to execute on a device such as a client device, such as a personal computer or gaming console, in real-time or near real-time. Such processing can be performed on content (e.g., a rendered version of a unique asset) that is generated on, or received by, that client device or received from an external source, such as streaming sensor data or other content received over at least one network. In some instances, the processing and/or determination of this content may be performed by one of these other devices, systems, or entities, then provided to the client device (or another such recipient) for presentation or another such use.

Figure 6:
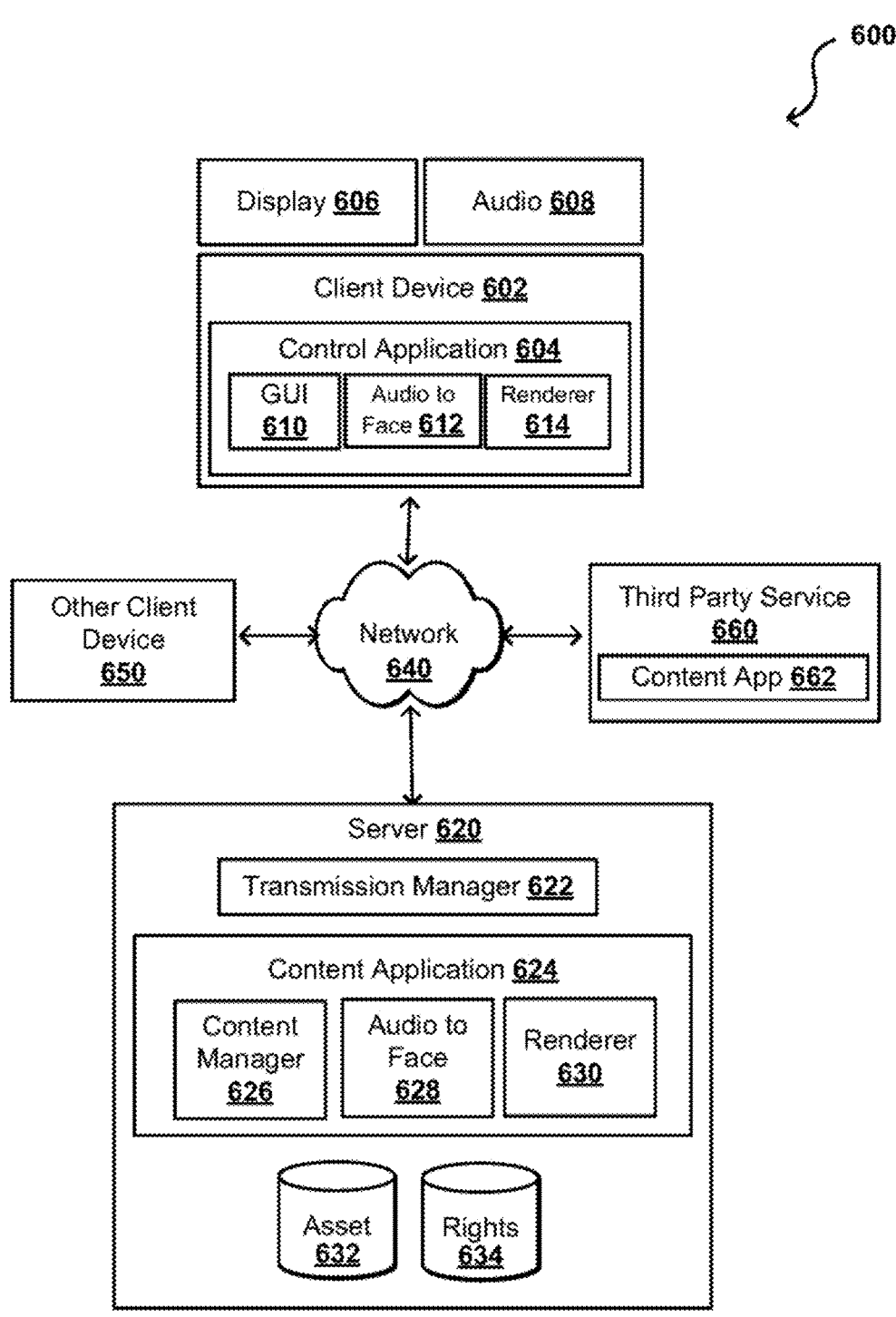
FIG. 6 illustrates components of a distributed system that can be used to generate image or video content, according to at least one embodiment.

As an example, FIG. 6 illustrates an example network configuration 600 that can be used to provide, generate, modify, encode, and/or transmit data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least client device 602, as may use a session manager and user data stored in a user database 634, and can cause content 632 to be determined by a content manager 626. A content manager 626 may work with an audio to emotion module 628 or system to determine motion corresponding to input audio considering emotion or style data, as well as a renderer 630 to generate image, video, or other visual presentation data using an asset (e.g., a character mesh) from an asset database 632, to an extent allowable as determined by a rights manager 630 or other such component or service. At least a portion of that generated content (separate and different from the assets themselves) may be transmitted to client device 602 using an appropriate transmission manager 622 to send by download, streaming, or another such transmission channel. An encoder may be used to encode and/or compress at least some of this data before transmitting to the client device 602. In at least one embodiment, client device 602 receiving such content can provide this content to a corresponding content application 604, which may also or alternatively include a graphical user interface 610, audio to emotion component 612, and renderer 614 for use in generating audio-driven animation or images. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 634, to client device 602. In at least one embodiment, at least a portion of this content can be obtained or streamed from another source, such as a third-party service 660 or other client device 650, that may also include a content application 662 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR/AR/MR headset, VR/AR/MR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

The systems and methods described herein may be used for a variety of purposes, by way of example and without limitation, for synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Inference and Training Logic

Figure 7A:
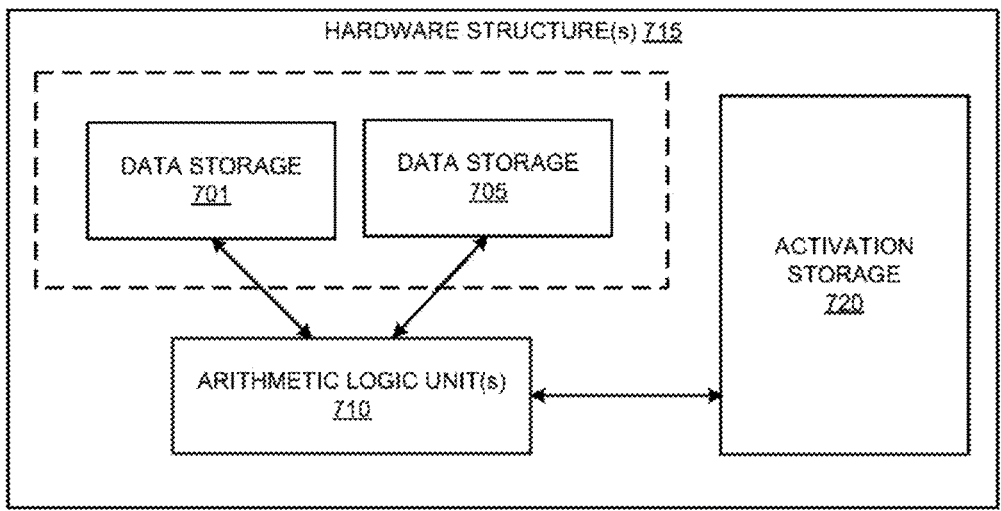
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7*a* may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7*a* may be used in conjunction with central processing unit ("CPU") hardware, graphics processing unit ("GPU") hardware or other hardware, such as field programmable gate arrays ("FPGAs").

Figure 7B:
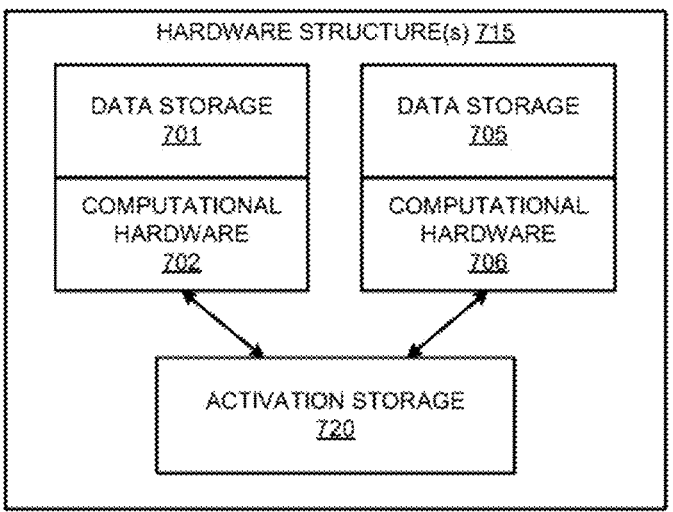
FIG. 7B illustrates inference and/or training logic, according to at least one embodiment.

FIG. 7*b* illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7*b* may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7*b* may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7*b*, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
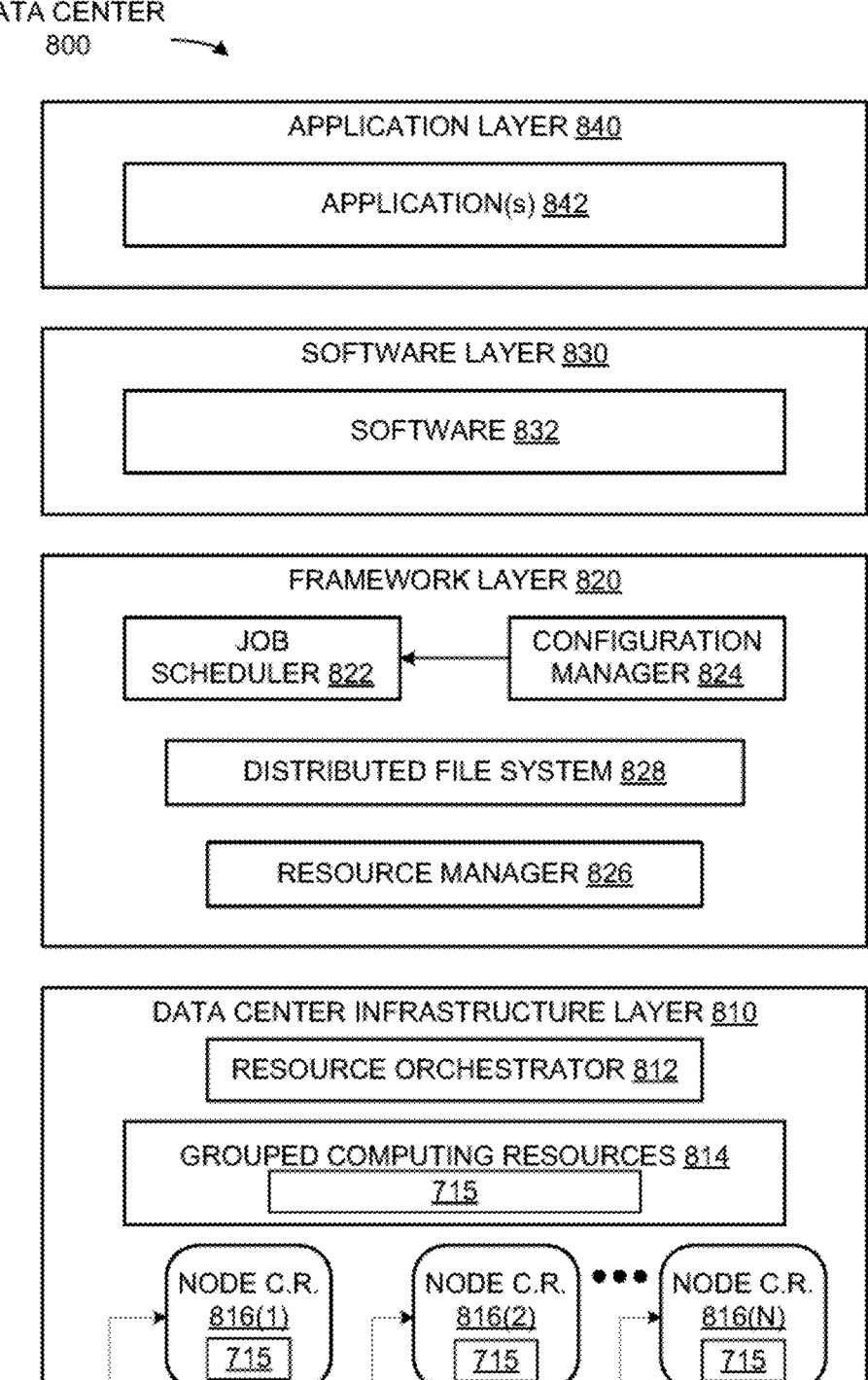
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used generate facial animation from audio data, including accurate depiction of emotional state

Computer Systems

Figure 9:
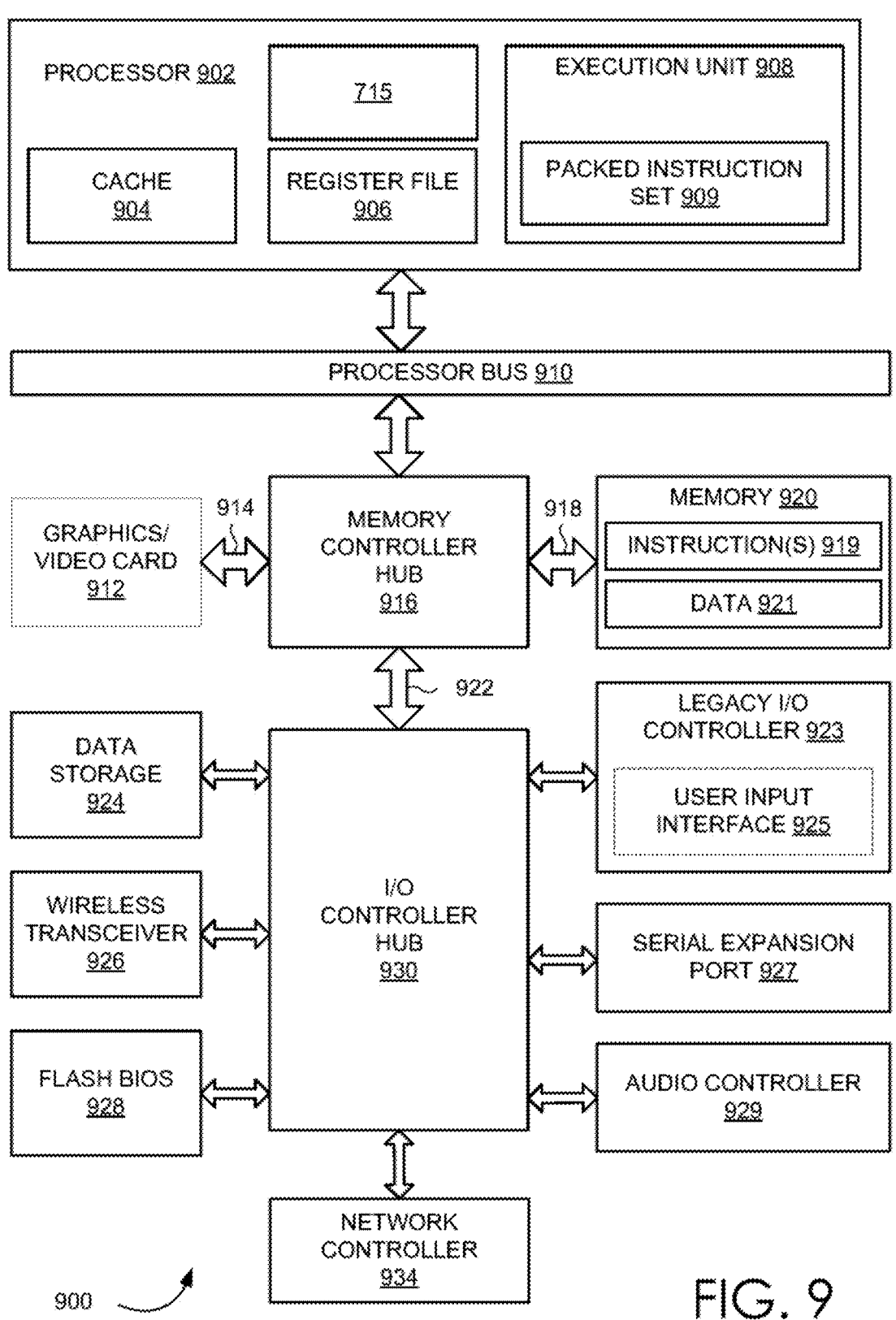
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs.

In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a micro-code ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used generate facial animation from audio data, including accurate depiction of emotional state.

Figure 10:
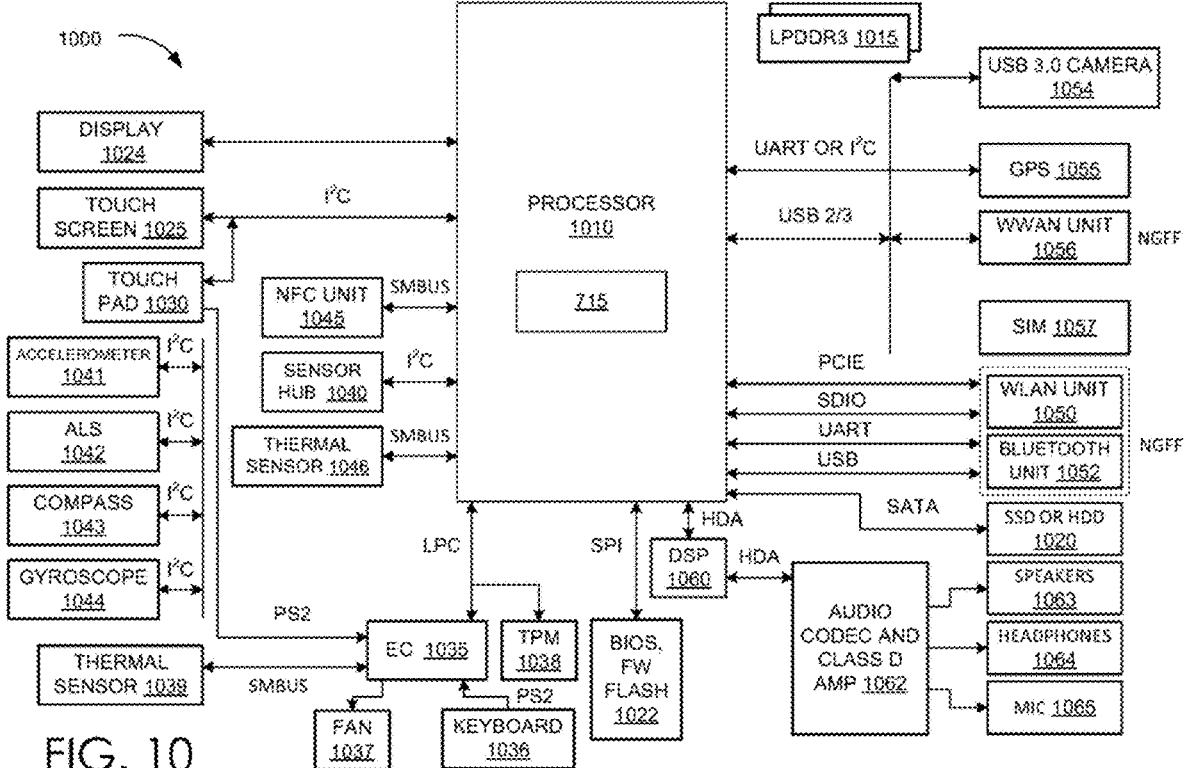
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used generate facial animation from audio data, including accurate depiction of emotional state.

Figure 11:
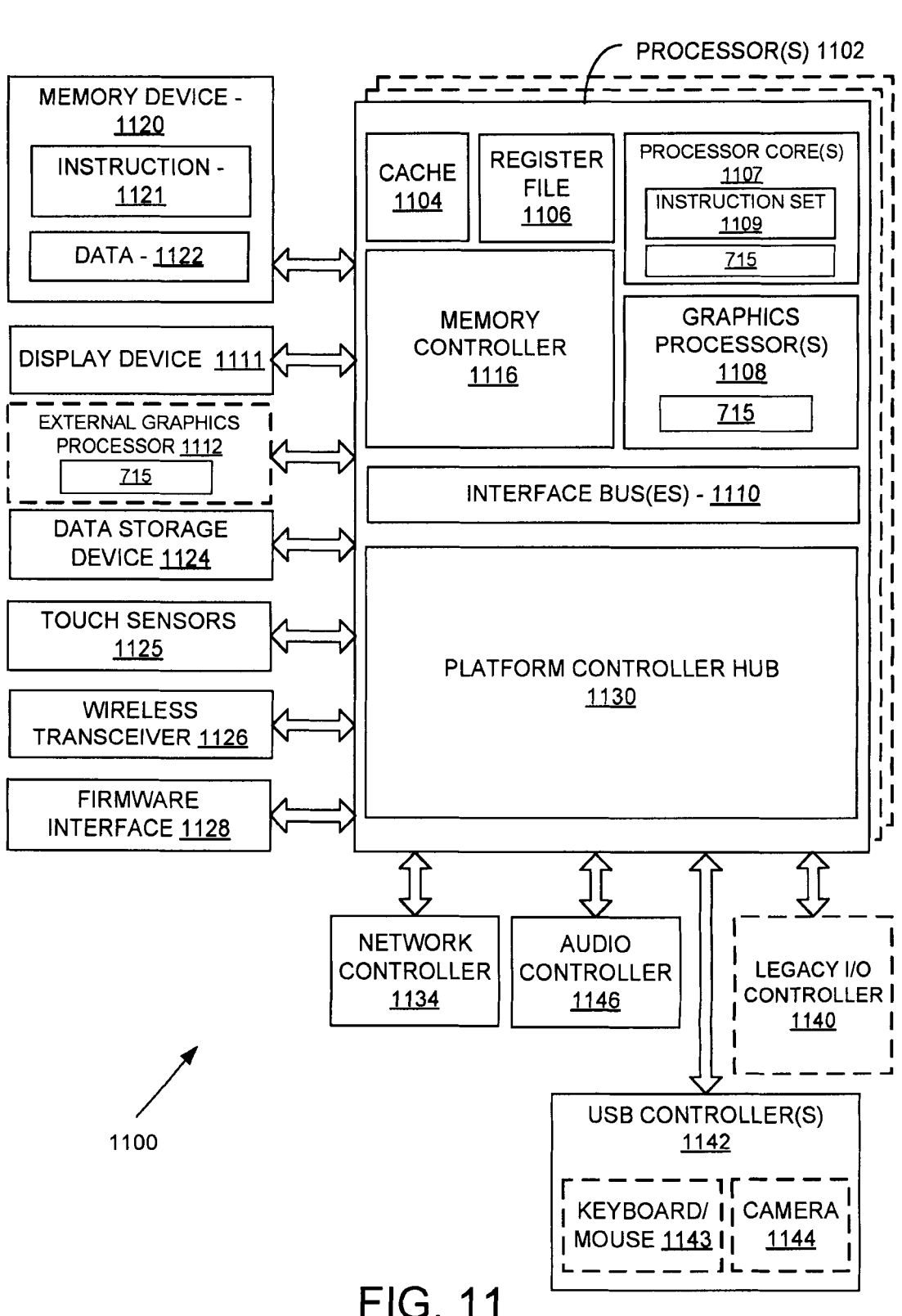
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used generate facial animation from audio data, including accurate depiction of emotional state.

Figure 12:
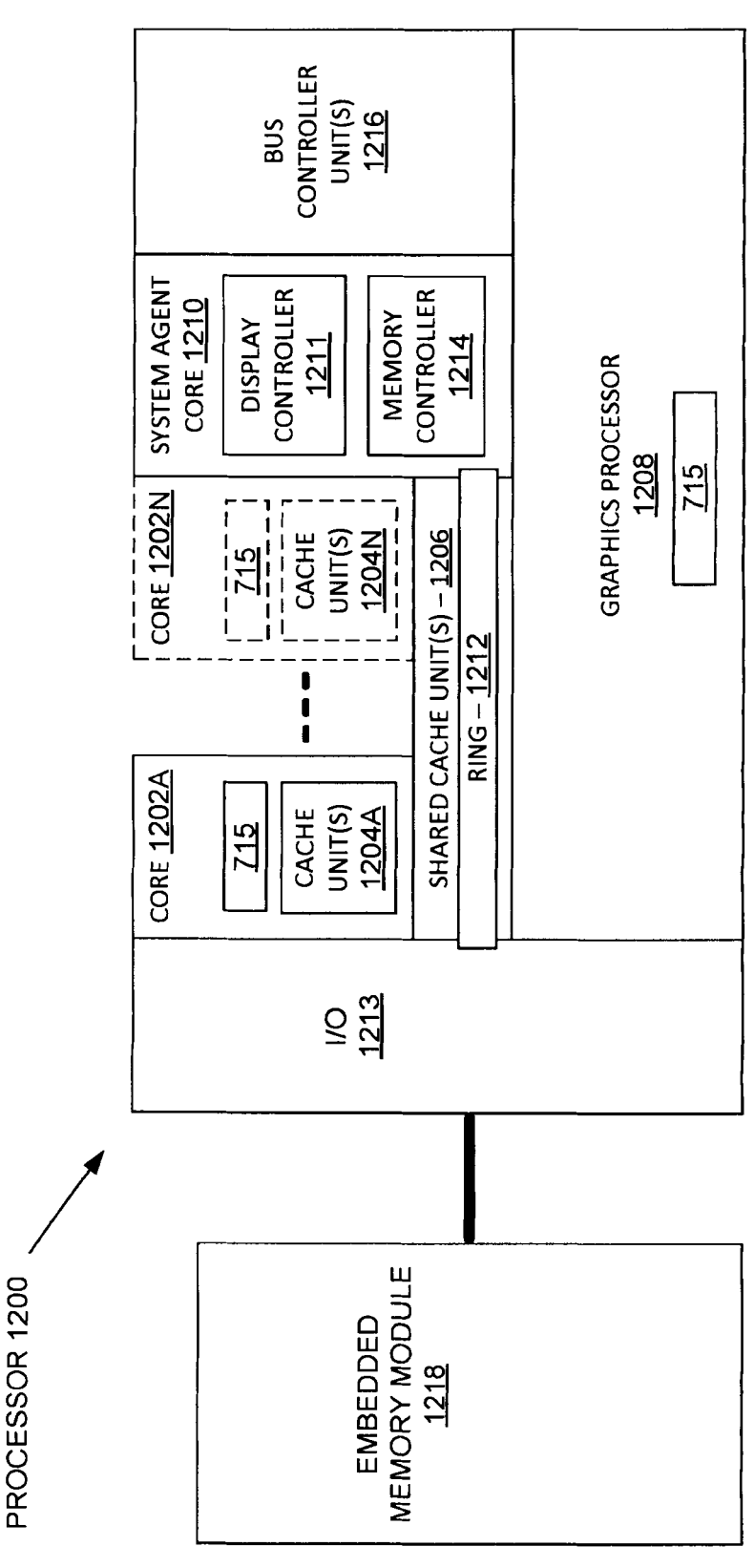
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multithreading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7*a* and/or 7*b*. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used generate facial animation from audio data, including accurate depiction of emotional state.

Virtualized Computing Platform

Figure 13:
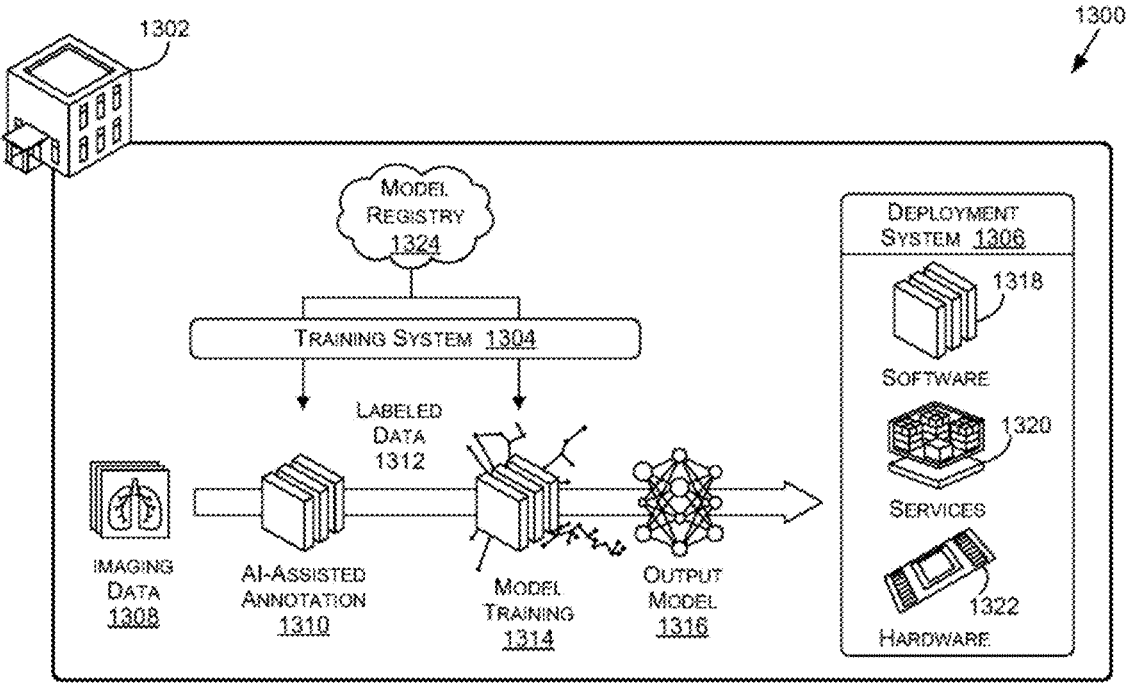
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
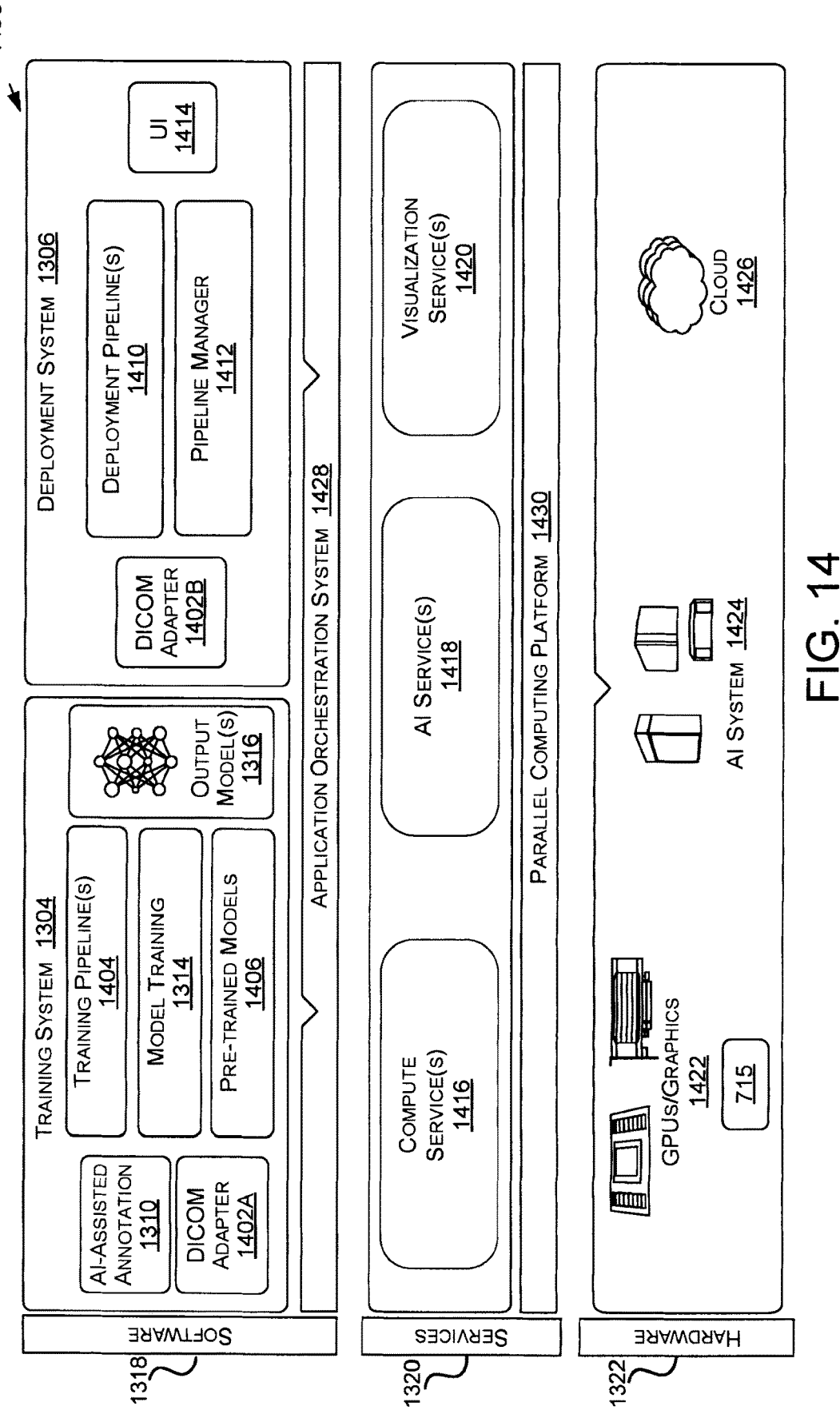
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
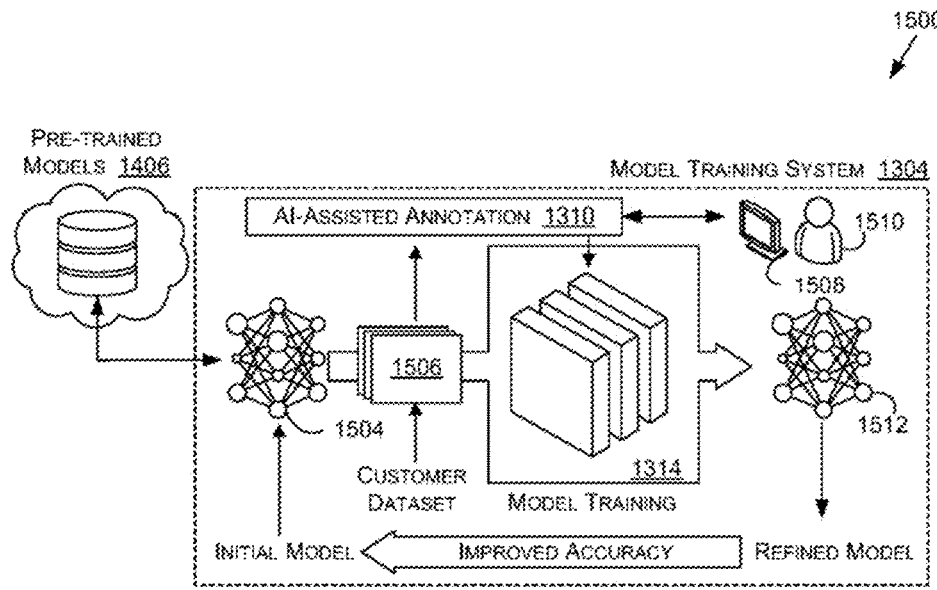
FIGS. 15A and 15B illustrate a data flow diagram for a process to train a machine learning model, as well as client-server architecture to enhance annotation tools with pre-trained annotation models, in accordance with at least one embodiment.
Figure 15B:
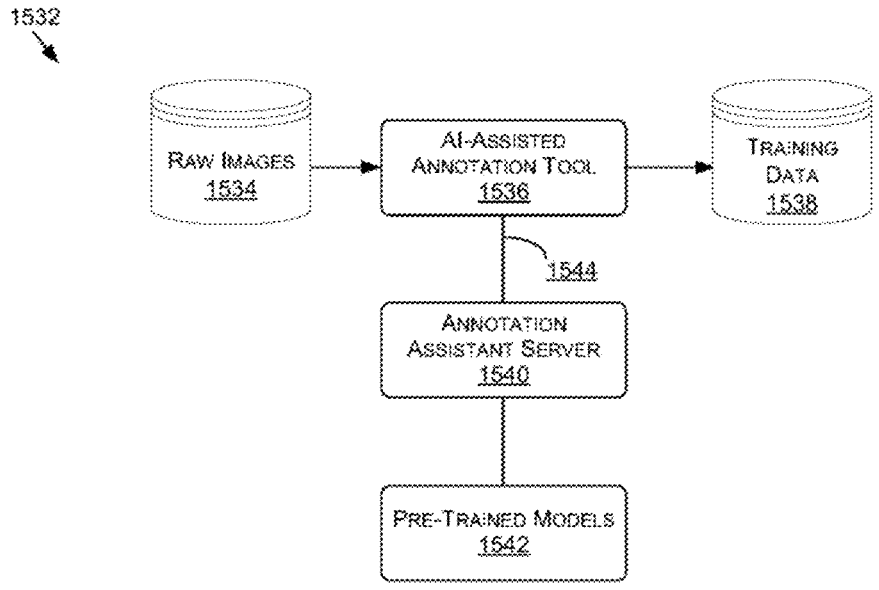

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an Mill machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322— deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12cc) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline (s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542

(e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used generate facial animation from audio data, including accurate depiction of emotional state.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:

computing, using a neural network and based at least in part on audio data corresponding to speech and an emotion vector indicative of one or more emotions associated with the speech, an output vector of feature position data, the feature position data corresponding to one or more positions of one or more feature points of one or more deformable facial components of a virtual character and to one or more rigid transformations of defined rigid portions of the one or more feature points, wherein a dimensionality of the output vector corresponds to a number of the one or more feature points; and rendering, for one or more time points in a sequence of time points of the audio data, image data representative of the character based, at least in part, on the feature position data to generate an animation of the character appearing to utter the speech.

2. The method of claim 1, wherein the feature position data is further computed based at least in part on a style vector indicative of at least one of a way in which the one or more emotions are to be conveyed, an extent to which the one or more emotions are to be conveyed, or one or more modifications to at least one feature point of the one or more feature points of the one or more deformable facial components.

3. The method of claim 1, wherein the one or more deformable facial components include at least one of a head, skin, eyeballs, a tongue, or a jaw of the character.

4. The method of claim 1, wherein the neural network has an architecture that includes at least one of: a U-Net architecture, a convolutional neural network (CNN)-based architecture, or a recurrent neural network (RNN)-based architecture.

5. The method of claim 1, wherein the audio data is representative of at least one of a portion of the speech corresponding to a time point prior to a respective time point of the one or more time points or a portion of the speech corresponding to a time point subsequent to the respective time point of the one or more time points.

6. The method of claim 1, further comprising:

generating the emotion vector representing at least emotional state data corresponding to an emotion instruction.

7. The method of claim 6, wherein the emotional state data represents labels for one or more emotions exhibited by the speech, and the emotional state data includes one or more weightings for the one or more emotions.

8. The method of claim 1, further comprising:

computing the feature position data based at least in part on retargeting second position data corresponding to a second character to the virtual character.

9. The method of claim 1, wherein the feature position data is further computed based at least in part on a style vector corresponding to at least one of a type of deformation to be performed with respect to the virtual character, an extent to which deformation is to be performed with respect to the virtual character, or a behavior modification for at least one feature point of the one or more feature points corresponding to the deformable facial components of the virtual character.

10. The method of claim 1, wherein the one or more feature points include one or more vertices of at least one deformable mesh.

11. The method of claim 1, wherein the method is performed by at least one of:

a system for performing simulation operations;

a system for rendering graphical output;

a system for performing deep learning operations;

a system for performing digital twin simulation;

a system implemented using an edge device;

a system incorporating one or more Virtual Machines (VMs);

a system implemented at least partially in a data center; or a system implemented at least partially using cloud computing resources.

12. A system, comprising:

one or more processing units to generate an animation of a character using an output vector of position data representative of one or more positions of one or more feature points of the character and of one or more rigid transformations of defined rigid portions of the one or more features points of the character, the position data computed based at least in part on a neural network processing audio data representative of speech and emotion data indicative of an emotion associated with the speech, wherein a dimensionality of the output vector corresponds to a number of the one or more feature points.

13. The system of claim 12, wherein the position data is further computed based at least in part on retargeting second position data corresponding to a second character to the character.

14. The system of claim 12, wherein the neural network has a U-Net architecture, a convolutional neural network (CNN)-based architecture, or a recurrent neural network (RNN)-based architecture.

15. The system of claim 12, wherein the system comprises at least one of:

a system for performing simulation operations;

a system for rendering graphical output;

a system for performing deep learning operations;

a system for performing digital twin simulation;

a system implemented using an edge device;

a system incorporating one or more Virtual Machines (VMs);

a system implemented at least partially in a data center; or a system implemented at least partially using cloud computing resources.

16. A processor comprising:

one or more processing units to:

compute, using a neural network, and based at least in part on audio data corresponding to speech and an emotion vector indicative of one or more emotions associated with the speech, an output vector of feature position data, the feature position data corresponding to one or more positions of one or more feature points of one or more deformable facial components of a virtual character and to one or more rigid transformations of defined rigid portions of the one or more feature points, wherein a dimensionality of the output vector corresponds to a number of the one or more feature points; and render, for one or more time points in a sequence of time points of the audio data, image data representative of the character based, at least in part, on the feature position data to generate an animation of the character appearing to utter the speech.

17. The processor of claim 16, wherein the feature position data is further computed based at least in part on a style vector indicative of at least one of a way in which the one or more emotions are to be conveyed, an extent to which the one or more emotions are to be conveyed, or one or more modifications to at least one feature point of the one or more feature points of the one or more deformable facial components.

18. The processor of claim 16, wherein the one or more deformable facial components include at least one of a head, skin, eyeballs, a tongue, or a jaw of the character.

19. The processor of claim 16, wherein the neural network has an architecture that includes at least one of: a U-Net architecture, a convolutional neural network (CNN)-based architecture, or a recurrent neural network (RNN)-based architecture.

20. The processor of claim 16, wherein the audio data is representative of at least one of a portion of the speech corresponding to a time point prior to a respective time point of the one or more time points or a portion of the speech corresponding to a time point subsequent to the respective time point of the one or more time points.

* * * * *